(12) United States Patent
Ong

(10) Patent No.: US 9,069,719 B2
(45) Date of Patent: Jun. 30, 2015

(54) METHOD AND SYSTEM FOR PROVIDING A SMART MEMORY ARCHITECTURE

(71) Applicant: Adrian Ong, Pleasanton, CA (US)

(72) Inventor: Adrian Ong, Pleasanton, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 202 days.

(21) Appl. No.: 13/691,639

(22) Filed: Nov. 30, 2012

(65) Prior Publication Data

US 2013/0212431 A1    Aug. 15, 2013

Related U.S. Application Data

(60) Provisional application No. 61/597,773, filed on Feb. 11, 2012.

(51) Int. Cl.

| G06F 11/00 | (2006.01) |
|---|---|
| G06F 15/167 | (2006.01) |
| G06F 11/10 | (2006.01) |
| G06F 3/06 | (2006.01) |
| G06F 11/07 | (2006.01) |
| G06F 12/00 | (2006.01) |
| G11C 11/16 | (2006.01) |
| G06F 21/00 | (2013.01) |
| G11C 13/00 | (2006.01) |

(52) U.S. Cl.
CPC .......... *G06F 15/167* (2013.01); *G06F 11/1076* (2013.01); *G06F 11/1008* (2013.01); *G06F 3/0601* (2013.01); *G06F 11/0751* (2013.01); *G06F 11/0793* (2013.01); *G06F 12/00* (2013.01); *G11C 11/16* (2013.01); *G06F 21/00* (2013.01); *G11C 13/0002* (2013.01)

(58) Field of Classification Search
CPC combination set(s) only.
See application file for complete search history.

(56) References Cited

U.S. PATENT DOCUMENTS

| 6,026,503 | A  * | 2/2000 | Gutgold et al. .................. 714/45 |
|---|---|---|---|
| 6,138,249 | A  | 10/2000 | Nolet |
| 6,584,589 | B1 | 6/2003 | Perner et al. |
| 6,657,914 | B1 | 12/2003 | Ong |
| 6,754,866 | B1 | 6/2004 | Ong et al. |
| 6,760,865 | B2 | 7/2004 | Ledford et al. |
| 6,904,389 | B2 | 6/2005 | Hornberger et al. |
| 6,950,334 | B2 | 9/2005 | Shimizu et al. |
| 7,365,557 | B1 | 4/2008 | Ong |
| 7,466,160 | B2 | 12/2008 | Ong et al. |
| 7,466,603 | B2 | 12/2008 | Ong |
| 7,664,993 | B2 | 2/2010 | Alladi et al. |
| 7,673,193 | B1 | 3/2010 | Ong et al. |

(Continued)

*Primary Examiner* — Charles Ehne
(74) *Attorney, Agent, or Firm* — Renaissance IP Law Group LLP

(57) ABSTRACT

A smart memory system preferably includes a memory including one or more memory chips, and a processor including one or more memory processor chips. The processor may include a common address/data/control memory bus that is configured to provide an asynchronous handshaking interface between the memory array and the memory processor. The processor can offload error data from the memory chip for analysis, and can store poor retention bit address information for memory refreshing in a non-volatile error retention memory. Program logic can also be included for memory address re-configuration. Power management logic can also be included, which may have a process-voltage-temperature compensation voltage generator for providing stable and constant read currents. An asynchronous handshaking interface is provided between the memory array and the memory processor. Write error tagging and write verification circuits can also be included.

7 Claims, 32 Drawing Sheets

(56) References Cited

U.S. PATENT DOCUMENTS

| | | |
|---|---|---|
| 7,725,611 B2 * | 5/2010 | Ohashi et al. .................... 710/7 |
| 7,768,847 B2 | 8/2010 | Ong |
| 7,779,311 B2 | 8/2010 | Ong |
| 8,042,012 B2 | 10/2011 | Baker |
| 2005/0257095 A1 * | 11/2005 | Rapaich ........................ 714/42 |
| 2006/0259814 A1 * | 11/2006 | Korhonen ...................... 714/10 |
| 2008/0301529 A1 * | 12/2008 | Spanel et al. ................. 714/765 |

\* cited by examiner

Table 1: Pin Out

| Symbol | Number of Pins | Type | Description |
|---|---|---|---|
| RD | 1 | Input | Read enable |
| WR | 1 | Input | Write enable |
| A<0:j> | j+1 | Input | Address |
| DQ<0:n> | n+1 | I/O | Data I/O |
| ACK | 1 | Output | Acknowledge |
| Vdd | TBD | Power | Supply Voltage |
| Vss | TBD | Ground | Supply Ground |

FIG. 15A

Table 2: Command Table

| RD | WR | Mode | I/O Pin | Address | ACK Output |
|---|---|---|---|---|---|
| L | L | Stand-by | Hi-Z | X | H |
| H | L | Read | $D_{OUT}$ | Valid | H → L → H |
| L | H | Write | $D_{IN}$ | Valid | H → L → H |

FIG. 15B

| Description | Symbol | Min | Max | Units |
|---|---|---|---|---|
| Input Set-up Time | tS | 2.5 | - | ns |
| Input Hold Time | tH | 2.5 | - | ns |
| Pre-charge Time | tPRE | 5 | - | ns |
| Read Start Time | tRD | - | 2 | ns |
| Read Hold Time | tRH | User defined | - | ns |
| Read Pulse Width | tRP | - | 10 | ns |
| Access Time | tAC | 1 | - | ns |
| Data Hold Time | tOH | - | 1 | ns |

| Description | Symbol | Min | Max | Units |
|---|---|---|---|---|
| Input Set-up Time | tS | 2.5 | - | ns |
| Input Hold Time | tH | 2.5 | - | ns |
| Pre-charge Time | tPRE | 5 | - | ns |
| Write Start Time | tWR | - | 2 | ns |
| Write Hold Time | tWH | 5 | - | ns |
| Write Pulse Width | tWP | 15 | - | ns |
| Output High-Z to Data-in Active | tZD | 5 | - | ns |
| ACK Pulse width | tACK | 3 | - | ns |

METHOD AND SYSTEM FOR PROVIDING A SMART MEMORY ARCHITECTURE

CROSS-REFERENCES TO RELATED APPLICATIONS

This application claims the benefit of commonly assigned provisional application Ser. No. 61/597,773, filed Feb. 11, 2012, entitled "A METHOD AND SYSTEM FOR PROVIDING A SMART MEMORY ARCHITECTURE," the contents of which is incorporated herein by reference in its entirety.

BACKGROUND

The present inventive concepts relate to a smart memory architecture, and more particularly to a method and system for providing a smart memory architecture for resistive type memory.

The present inventive concepts relate to memory systems for storing and retrieving information from memory integrated circuits, including static random access memory (SRAM), dynamic random access memory (DRAM), Flash memory, phase-change random access memory (PCRAM), spin-transfer torque random access memory (STT-RAM), magnetic random access memory (MRAM), resistive random access memory (RRAM), and future memory devices. Inventive aspects described herein are particularly well-suited for memories such as STT-RAM, MRAM and RRAM memories, which exhibit probabilistic-type characteristics and relatively high error rates.

Semiconductor memory devices have been widely used in electronic systems to store data. There are two general types of semiconductor memories: non-volatile and volatile memories. A volatile memory device, such as a Static Random Access Memory (SRAM) or a Dynamic Random Access Memory (DRAM), loses its data when the power applied to it is turned off. A non-volatile semiconductor memory device, however, such as a Flash, Erasable Programmable Read Only Memory (EPROM) or a magnetic random access memory (MRAM), retains its charge even after the power applied thereto is turned off. Where loss of data due to power failure or termination is unacceptable, a non-volatile memory is therefore used to store the data.

FIGS. 1A-1D are simplified, schematic cross-sectional illustrations of a magnetic tunnel junction (MTJ) structure 10 used in forming a spin transfer torque (STT) MRAM cell. Referring to FIGS. 1A-1D, an MTJ 10 is shown as including, in part, a reference layer 12, a tunneling layer 14, and a free layer 16. The reference layer 12 and the free layer 16 can be ferromagnetic layers, while the tunneling layer 14 is a non-magnetic layer. The direction of magnetization of reference layer 12 is fixed during manufacture and therefore does not change during operation of the STT-RAM memory device. However, the direction of magnetization of the free layer 16 can be varied during operation by passing a current of the required strength through the MTJ structure.

In FIG. 1A, the reference layer 12 and the free layer 16 are shown having the same directions of magnetization, i.e., in a parallel magnetic state. In FIG. 1B, the reference layer 12 and the free layer 16 are shown having opposite magnetization directions, i.e., in an anti-parallel state. In FIG. 1C, the reference layer 12 and the free layer 16 are shown having the same magnetization direction (parallel state), with the magnetization direction perpendicular to a plane defined by the interface of free layer 16 and tunneling layer 14. In FIG. 1D, the reference layer 12 and the free layer 14 are shown having opposite magnetization directions (anti-parallel state), where the magnetization directions are perpendicular to a plane defined by the interface of free layer 16 and tunneling layer 14.

To switch from the parallel state, as shown in FIGS. 1A and 1C, to the anti-parallel state, as shown in FIGS. 1B and 1D, the voltage potential of reference layer 12 is increased relative to that of free layer 16. This voltage difference causes spin polarized electrons flowing from free layer 16 to reference layer 12 to transfer their angular momentum and change the magnetization direction of free layer 16 to the anti-parallel state. To switch from the anti-parallel state to the parallel state, the voltage potential of free layer 16 is increased relative to that of reference layer 12. This voltage difference causes spin polarized electrons flowing from reference layer 12 to free layer 16 to transfer their angular momentum and change the magnetization direction of free layer 16 to the parallel state.

To switch from the parallel state to the non-parallel state or vice versa, the voltage applied to MTJ 10 and the corresponding current flowing through MTJ must each be greater than a respective pair of threshold values. The voltage that must exceed a threshold voltage in order for the switching to occur is also referred to as the switching voltage $V_c$. Likewise, the current that must exceed a threshold current in order for the switching to occur is referred to as the switching current $I_c$.

As is well known, when free layer 16 and reference layer 12 have the same magnetization direction (i.e., parallel state), MTJ 10 has a relatively low resistance. Conversely, when free layer 16 and reference layer 12 have the opposite magnetization direction (i.e., anti-parallel state), MTJ 10 has a relatively high resistance. This difference in resistance values provides the ability of the MTJ 10 to act as a memory storage device. Due to the physical properties of an MTJ, the critical current required to change an MTJ from a parallel state to an anti-parallel state is often greater than the critical current required to change the MTJ from an anti-parallel state to a parallel state.

FIG. 2A shows a magnetic tunnel junction (MTJ) 10, which forms a variable resistor in an STT-MRAM type memory cell, and an associated select transistor 20, together forming an STT-MRAM cell 30. The MTJ 10 includes a reference or pinned layer 12, a free layer 16, and a tunneling layer 14 disposed between the reference layer 12 and the free layer 16. Transistor 20 is often an NMOS transistor due to its inherently higher current drive, lower threshold voltage, and smaller area relative to a PMOS transistor. The current used to write a "1" in MRAM 30 can be different than the current used to write a "0". The asymmetry in the direction of current flow during these two write conditions is caused by the asymmetry in the gate-to-source voltage of transistor 20.

In the following description, an MRAM cell is defined as being in a logic "0" state when the free and reference layers of its associated MTJ are in a parallel (P) state, i.e., the MTJ exhibits a low resistance. Conversely, an MRAM cell is defined as being in a logic "1" state when the free and reference layers of its associated MTJ are in an anti-parallel (AP) state, i.e., the MTJ exhibits a high resistance. It will be understood that in other embodiments, the MRAM cell can be defined as being in the logic "0" state when in an AP state, and the logic "1" state when in a P state. Furthermore, in the following, it is assumed that the reference layer of the MTJ 10 faces its associated select transistor, as shown in FIG. 2A.

Therefore, in accordance with the discussion above, a current flowing along the direction of arrow 35 (i.e., the up direction) either (i) causes a switch from the P state to the AP state thus to write a "1", or (ii) stabilizes the previously established AP state of the associated MTJ. Likewise, a current flowing along the direction of arrow 40 (i.e., the down direction) either (i) causes a switch from the AP state to the P state thus to write a "0", or (ii) stabilizes the previously established P state of the associated MTJ. It is understood, however, that in other embodiments this orientation may be reversed so that the free layer of the MTJ faces its associated select transistor. In such embodiments (not shown), a current flowing along the direction of arrow 35 either (i) causes a switch from the AP state to the P, or (ii) stabilizes the previously established P state of the associated MTJ. Likewise, in such embodiments, a current flowing along the direction of arrow 40 either (i) causes a switch from the P state to the AP state, or (ii) stabilizes the previously established AP state.

FIG. 2B is a schematic representation of MRAM 30 of FIG. 2A in which MTJ 10 is shown as a storage element whose resistance varies depending on the data stored therein. The MTJ 10 changes its state (i) from P to AP when the current flows along arrow 35, and/or (ii) from AP to P when the current flows along arrow 40.

The voltage required to switch the MTJ 10 from an AP state to a P state, or vice versa, must exceed the critical switching voltage, $V_{c0}$. The current corresponding to this voltage is referred to as the critical or switching current $I_{c0}$. While the specified critical value $V_{c0}$ and related critical switching current $I_{c0}$ can be defined in various ways, such values can be selected based on a 50% switching probability of the memory cell within a specified time. In other words, the critical switching current $I_{c0}$ can be selected or otherwise determined based on the design of the MTJ 10 and/or based on measurements of the probability of switching at a particular critical value $V_{c0}$ and/or switching current $I_{c0}$. When the threshold critical switching current $I_{c0}$ is satisfied, there can be a 50% chance that the stored memory bit switches values (e.g., from a "0" to a "1" or a "1" to a "0"). An overdrive current is applied to guarantee that switching occurs at an error rate that is acceptable to meet standard reliability expectations. This overdrive current, or switching current, $I_{sw}$, may be 1.3 times, 1.5 times, 2 times, or more than 2 times the value of $I_{c0}$. For example, if the $I_{c0}$ for an MTJ device is 7 microamps (uA) at a 20 nanosecond (ns) write pulse width, then the $I_{sw}$ used to reliably switch the states of the MTJ may be 11 uA or greater.

In some cases, the "safe" write current (e.g., where the write error rate is less than about 10e-9) may be 1.5 to 2 times the critical switching current $I_{c0}$ for a certain period of time, for example, 10 nanoseconds. To read the bit value back out of the memory cell, a relatively "safe" read current can be applied (e.g., where the read error rate is less than about 10e-9). For example, the "safe" read current may be 0.2 times (i.e., 20%) of the critical switching current $I_{c0}$. By way of another example, if the critical switching current $L_{c0}$ is 6 microamps (uA), then the write current under a normal operation mode can be at least 12 uA, or thereabout, and the read current under a normal operating mode can be less than 1.2 uA, or thereabout. In this manner, the probability of the memory cell properly switching under a normal write condition is very high, in some cases near 100%. Similarly, the probability of accidentally switching the value of the memory cell under a normal read condition can be very low, in some cases near zero.

Once in the AP state, removing the applied voltage does not affect the state of the MTJ 10. Likewise, to transition from the AP state to the P state under the normal operating mode, a negative voltage of at least $V_{c0}$ is applied so that a current level of at least the switching current $I_{c0}$ flows through the memory cell in the opposite direction. Once in the P state, removing the applied voltage does not affect the state of the MTJ 10.

In other words, MTJ 10 can be switched from an anti-parallel state (i.e., high resistance state, or logic "1" state) to a parallel state so as to store a "0" (i.e., low resistance state, or logic "0" state). Assuming that MTJ 10 is initially in a logic "1" or AP state, to store a "0", under the normal operating mode, a current at least as great or greater than the critical current $I_{c0}$ is caused to flow through transistor 20 in the direction of arrow 40. To achieve this, the source node (SL or source line) of transistor 20 is coupled to the ground potential via a resistive path (not shown), a positive voltage is applied to the gate node (WL or wordline) of transistor 20, and a positive voltage is applied to the drain node (BL or bitline) of transistor 20.

As mentioned above, MTJ 10 can also be switched from a parallel state to an anti-parallel state so as to store a "1". Assuming that MTJ 10 is initially in a logic "0" or P state, to store a "1", under the normal operating mode, a current at least as great or greater than the critical current $I_{c0}$ is caused to flow through transistor 20 in the direction of arrow 35. To achieve this, node SL is supplied with a positive voltage via a resistive path (not shown), node WL is supplied with a positive voltage, and node BL is coupled to the ground potential via a resistive path (not shown).

FIG. 3 represents the variation in the MTJ state (or its resistance) during various write cycles. To transition from the P state (low resistance state) to AP state (high resistance state), a positive voltage at least as great or greater than the critical switching voltage $V_{c0}$ is applied. Once in the AP state, removing the applied voltage does not affect the state of the MTJ. Likewise, to transition from the AP state to the P state, a negative voltage less than the critical switching voltage $V_{c0}$ is applied. Once in the P state, removing the applied voltage does not affect the state of the MTJ. The resistance of the MTJ is $R_{high}$ when it is in the AP state. Likewise, the resistance of the MTJ is $R_{low}$ when it is in the P state.

FIG. 4A shows an MTJ 10 being programmed to switch from an anti-parallel state (i.e., high resistance state, or logic "1" state) to a parallel state so as to store a "0" (i.e., low resistance state, or logic "0" state). In this Figure, it is assumed that the MTJ 10 is initially in a logic "1" or AP state. As described above, to store a "0", a current $I_{sw}$ at least as great or greater than the critical current $I_{c0}$ is caused to flow through transistor 20 in the direction of arrow 40. To achieve this, the source node (SL) of transistor 20 is coupled to the ground potential via a resistive path (not shown), a positive voltage $V_{PP}$ is applied to the gate node (WL or wordline) of transistor 20, and a positive voltage $V_{CC}$ is applied to the drain node (BL or bitline) of transistor 20.

FIG. 5 is an exemplary timing diagram of the voltage levels at nodes WL, SL, SN and BL during a write "0" operation, occurring approximately between times 25 ns and 35 ns, and a write "1" operation, occurring approximately between times 45 ns and 55 ns, for a conventional MTJ such as MTJ 10 shown in FIGS. 4A and 4B. The supply voltage $V_{CC}$ is assumed to be about 1.8 volts. The wordline signal WL, as well as the column select signal CS, are shown as having been boosted to a higher $V_{PP}$ programming voltage of 3.0 volts. During the write "0" operation, the voltages at nodes BL, SL and SN are shown as being approximately equal to 1.43V, 0.34V, and 0.88V respectively. During the write "1" operation, the voltages at nodes BL, SL and SN are shown as being approximately equal to 0.23V, 1.43V, and 0.84V respectively. Although not shown, for this exemplary computer simulation, the currents flowing through the MTJ during write "0" and "1" operations are 121 μA and 99.2 μA, respectively.

FIG. 4B shows an MTJ being programmed to switch from a parallel state to an anti-parallel state so as to store a "1". It is assumed that MTJ 10 is initially in a logic "0" or P state. To store a "1", a current $I_{sw}$ that is greater than the critical current $I_{c0}$ is caused to flow through transistor 20 in the direction of arrow 35. To achieve this, node SL is supplied with the voltage $V_{CC}$ via a resistive path (not shown), node WL is supplied with the voltage $V_{PP}$, and node BL is coupled to the ground potential via a resistive path (not shown). Accordingly, during a write "1" operation, the gate-to-source voltage of transistor 20 is set to ($V_{WL}$-$V_{SN}$), and the drain-to-source voltage of transistor 20 is set to ($V_{SL}$-$V_{SN}$). This STT-RAM type memory cell can provide an excellent non-volatile memory solution.

Unfortunately, with STT-RAM or any other type of memory chip, manufacturing or other defects may result in not all memory cells on a memory chip functioning properly. During memory repair, a memory chip may be tested and failed memory elements replaced by redundant memory elements. Typically called laser repair, this memory repair is generally performed after the first wafer sort test. A laser is used to blow the memory fuse banks to disable the defective memory elements and replace them with the redundant elements. Memory repair is not made available to the memory's end-user.

Various memory systems have been proposed to provide memory access, secure data storage, data verification and recovery, data testing, and memory repair. These systems include, for instance, U.S. Pat. No. 6,657,914, entitled "CONFIGURABLE ADDRESSING FOR MULTIPLE CHIPS IN A PACKAGE"; U.S. Pat. No. 6,754,866, entitled "TESTING OF INTEGRATED CIRCUIT DEVICE"; U.S. Pat. No. 7,365,557, entitled "INTEGRATED TESTING MODULE INCLUDING DATA GENERATOR"; U.S. Pat. No. 7,466,160, entitled "SHARED MEMORY BUS ARCHITECTURE FOR SYSTEM WITH PROCESSOR AND MEMORY UNITS"; U.S. Pat. No. 7,466,603, entitled "MEMORY ACCESSING CIRCUIT SYSTEM"; U.S. Pat. No. 7,673,193, entitled "PROCESSOR-MEMORY UNIT FOR USE IN SYSTEM-IN-PACKAGE AND SYSTEM-IN-MODULE DEVICES"; U.S. Pat. No. 7,768,847, entitled "PROGRAMMABLE MEMORY REPAIR SCHEME"; and U.S. Pat. No. 7,779,311 entitled "TESTING AND RECOVERY OF MULTILAYER DEVICE", the contents of each of which are hereby incorporated by reference in their entirety.

Although these and other systems have addressed similar problems to those addressed by the present inventive principles, they have not been designed for, or applied specifically to, memory with high error rates and probabilistic tendencies such as PCRAM, MRAM, and RRAM devices. In particular, U.S. Pat. No. 7,673,193 describes an apparatus and method for a processor memory unit for use in system-in-package (SiP) and system in module (SiM) integrated circuit devices which includes a processing module, a memory module, and a programmable system module. The programmable system module is configured to function as an interface between the memory module and a testing device to facilitate integration and testing of processor-memory units including functional components having different communication protocols. The interface layer (system module) 120 can include process specific signal processing algorithms for yield enhancement, data compression, test algorithms, power management, etc. This system is particularly useful for multi-chip DRAM plus logic interface products. According to additional features and embodiments incorporating principles of the inventive concept, however, the usefulness of this type of system can be extended to Flash memory, PCRAM, MRAM, RRAM, and future memory devices.

BRIEF SUMMARY

According to features and principles of the present inventive concepts, a smart memory system preferably allows memories with high error rates and slow read/write times relative to a logic processor to work reliably and seamlessly. These inventive features can provide particularly useful benefits for memories suffering from probabilistic tendencies and higher error rates. Among other things, a smart memory system incorporating principles of the present inventive concept can be configured to allow non-volatile memory bits with a high write error rate to be used by tagging the failed location and corresponding data, and by then performing re-writes at a convenient time or by simply masking the failed location and re-writing the data to a different location.

Some features of embodiments incorporating one or more of the present inventive concepts may include a common asynchronous memory bus with acknowledge signaling to guarantee write and read success. The handshaking memory interface may allow for process-independent, voltage-independent, and temperature-independent operation by using internal read and write tracking and verifying schemes.

The system may further be configured to dynamically monitor memory system failures and record fail locations and error types by storing them in a memory controller non-volatile memory (NVM). The system can further be configured to recall the fail location and type of failure from the NVM table and perform an appropriate fix based on the type of failure. These fixes can, for instance, include re-writing the data, repairing the memory, isolating the failed memory location, or other appropriate fixes.

The system may further be configured to provide refresh cycles to the memory with poor retention characteristics. An initial stress test may be provided by a smart controller to screen for weakness in the memory. Based on failure modes and stress level (voltage, current, temperature, etc) statistical data, the smart memory can be automatically configured to provide a certain fix refresh interval. The refresh interval can be 3 seconds, 10 days, 5 weeks, 2 months, or more, for example. The time can be determined by an internal very low power clock. Refresh cycle consists of reading the entire memory and then re-writing the same data. The circuitry can be internal to the memory to implement the read and re-write function similar to the write-verify re-write circuitry.

The smart memory system may further be configured to permit on-chip testing even after implementation in an end-user device by allowing external Automated Test Equipment (ATE) direct access to the system memory. The ATE can schedule and perform a test pattern to test the system memory based, for instance, on a user request, an automatic test schedule, or in response to detected memory errors.

The smart memory system can also be configured to implement power management technologies. These power management technologies can, for instance, control SA read current, control SA clamp voltages, control SA read delay, control write voltage, control periphery voltage during standby, and/or manage other power requirements of the memory device.

A RISC processor or other types processors can also be included in the smart memory system, such as in the memory controller, to perform simple and/or complex computations on the data before storing it into the main system memory. This can provide added value for the smart memory system by allowing the device processor to offload various tasks to the memory controller processor and thereby free up device resources for other processes.

According to one specific embodiment incorporating principles of the present inventive concept, a smart memory system can comprise a memory consisting of one or more memory chips fabricated using memory processes, and a processor consisting of one or more memory processor chips fabricated using logic processes. The processor may, for instance, include a common address/data/control memory bus configured to provide an asynchronous handshaking interface between the memory array and the memory processor. The processor can also include a mechanism for offloading Write Error Tag memory data from the memory chip for analysis. Program logic for memory address reconfiguration can also be included, as well as power management logic.

The memory may also include a common address/data/control memory bus that provides an asynchronous handshaking interface between the memory array and memory processor. Write Error Tag and write/verify WRITE circuits can also be included in the memory along with a Design for Test (DFT) circuit for performing a fast parallel retention test. A test interface can also be included for SiP memory testing. Control registers and multiplexing circuitry are also preferably provided for address reconfiguration, and separate power planes and gating circuitry can be included for power management.

Various benefits can be provided by the present inventive principles, including, among other things enabling compatibility to multiple systems. Configurable address schemes can be used which support multiple processors and peripherals, along with a programmable and memory-type independent I/O interface.

Certain of the inventive features may be best achieved by implementing them in a System-in-Package (SiP) or System-on-Chip (SoC). Such implementations need good connectivity between a memory array and memory processor chips. This may be accomplished, for instance, using True Silicon Via (TSV) or other SiP technology. Using low latency and high throughput SiP interconnects can provide improved system performance. The cost disadvantages of such a system may be minimized as SiP interconnect technology costs continue to decrease.

The inventive principles can also enable reduced power consumption by reducing I/O loading using SiP solutions, by providing clock-less memory operation, and/or by shutting down unused memory sections. Voltage control, temperature compensation, and asynchronous timing circuitry can also help reduce power consumption and provide more efficient operation.

Other principles allow the device processor to offload repetitive computations or other tasks to the smart memory system. For instance, an ARM, MIPs, or other desired proprietary processor combination can be provided in the memory controller or other area of the smart memory system to perform various processing tasks to free up device resources.

Memory monitoring, repair, correction, and re-assignment can also be performed by the smart memory controller according to principles of the present inventive concept. ECC, anti-fuse repair, error masking, read-compare-write, weak bit replacement, and other error correction technologies can be implemented in the smart memory system to enhance data stability and reduce error rates.

In accordance with one embodiment incorporating principles of the present inventive concept, a memory circuit can include, in part, a compare block configured to compare a first data adapted to be stored in a memory cell to a second data previously stored in the memory cell. The compare block is further configured to store an address of the memory cell in which the second data is stored if the second data does not match the first data. The memory cell is written to during subsequent write cycles. The address may be stored in a tag memory. The memory cell may, for instance, be a DRAM, SRAM, ROM, PROM, EEPROM, FLASH, FeRAM, PCRAM, RRAM, MRAM or STT-MRAM cell.

In some embodiments, the memory circuit can further include a memory array, a write block and a read block. The write block can be coupled between the memory array and the compare block. The read block can be coupled between the memory array and the compare block such that the read block is adapted to sense the second data. The memory circuit may further include control logic configured to store an inverse of the second data to the memory cell when the memory cell is not being accessed for a normal write operation by a device external to the memory.

In one embodiment, the memory array can include at least one column coupled to a multitude of the memory cells. The column includes a first signal line and a second signal line. The memory cell includes a first current carrying terminal coupled to the first signal line, a second current carrying terminal coupled to the second signal line and a control terminal coupled to a word-line. The memory cell may further include a magnetic tunnel junction and a first transistor. The magnetic tunnel junction can have a first terminal coupled to the first current carrying terminal of the memory cell. The first transistor can have a first current carrying terminal coupled to the second current carrying terminal of the non-volatile memory cell, a gate terminal coupled to the control terminal of the non-volatile memory cell, and a second current carrying terminal coupled to a second terminal of the magnetic tunnel junction.

In accordance with one embodiment, a method of correcting write errors during a write operation in a memory circuit can include comparing a first data adapted to be stored in a memory cell to a second data previously stored in the memory cell during a write operation, storing an address of the memory cell in which the second data is stored if the second data does not match the first data, and writing to the memory cell during subsequent write cycles to correct the write error. The method can further include latching the address of the memory cell, latching the first data, writing the first data into a memory array at the address of the memory cell, and sensing the second data during the write operation.

In accordance with another aspect, a method of correcting write errors during a write operation in a memory circuit can include comparing a first data adapted to be stored in a memory cell to a second data previously stored in the memory cell during a write operation, inverting the second data if the second data does not match the first data and writing the inverted second data to an address of the memory cell in which the second data is stored if the second data does not match the first data to correct the write error. The method can further include latching the address of the memory cell, latching the first data, writing the first data into a memory array at the address of the memory cell and sensing the second data during the write operation.

In accordance with yet another aspect, a method of correcting write errors after a write operation in a memory circuit can include loading an address of a memory cell in which a second data is stored if the second data does not match a first data after a write operation, sensing the second data, inverting the second data and writing the inverted second data to an address of the memory cell in which the second data is stored to correct the write error.

In still further embodiments, a non-volatile memory (NVM) program memory can be utilized to store information regarding failed address locations and the type of error. The NVM program memory can further be used to reassign addresses of failed memory locations to new memory locations. A memory controller of the smart memory system can interface with the NVM program memory to perform memory tests, reassign memory addresses, perform memory refreshes, or take other appropriate action based on the error information stored in the NVM program memory.

BRIEF DESCRIPTION OF THE DRAWINGS

The foregoing and additional features and advantages of the present inventive principles will become more readily apparent from the following detailed description, made with reference to the accompanying figures, in which:

FIGS. 15A and 15B are a pin out table and command table, respectively, according to inventive concepts.

DETAILED DESCRIPTION

Figure 1A:
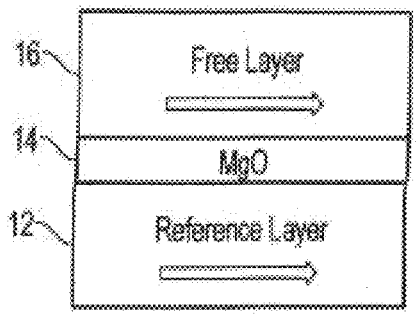
FIG. 1A is a simplified schematic, cross-sectional view of a magnetic tunnel junction structure of a magnetic random access memory cell when placed in a parallel magnetization state, as known in the related art.
Figure 1B:
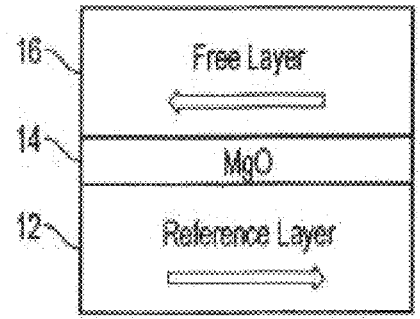
FIG. 1B is a simplified schematic, cross-sectional view showing the magnetic tunnel junction structure of FIG. 1A when placed in an anti-parallel magnetization state, as known in the related art.
Figure 1C:
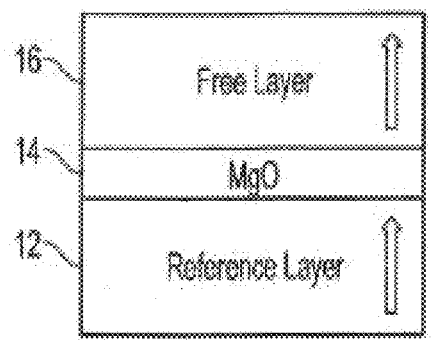
FIG. 1C is a simplified schematic, cross-sectional view of a magnetic tunnel junction structure of a magnetic random access memory (MRAM) cell when placed in a parallel magnetization state, as known in the related art.
Figure 1D:
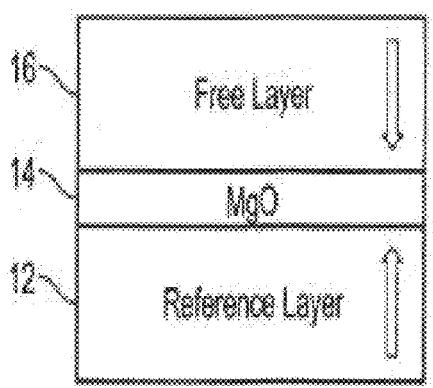
FIG. 1D is a simplified schematic, cross-sectional view showing the magnetic tunnel junction structure of FIG. 1C when placed in an anti-parallel magnetization state, as known in the related art.
Figure 2A:
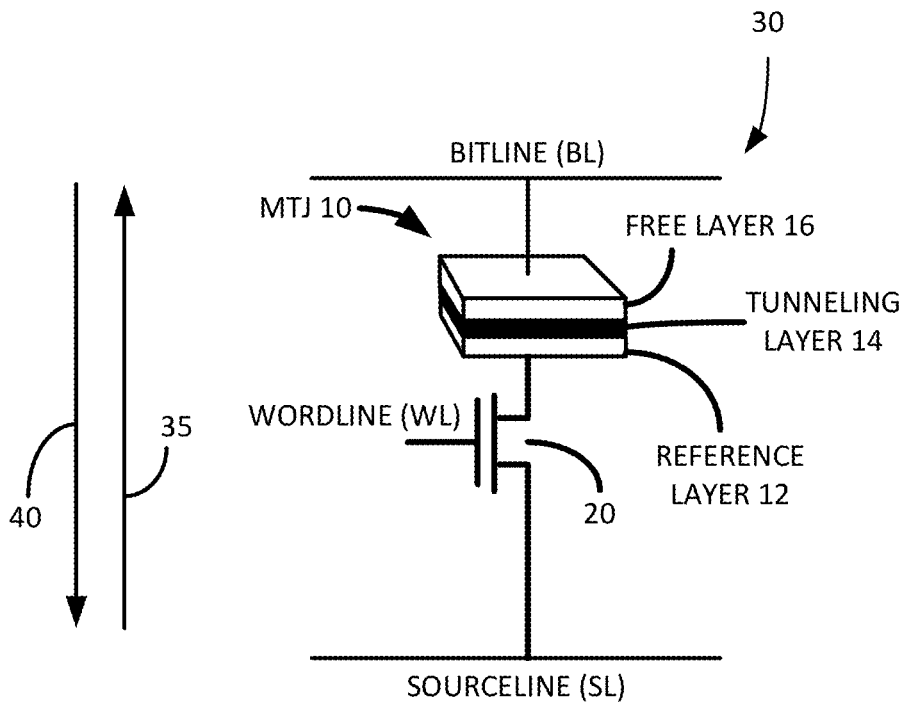
FIG. 2A is a schematic illustration showing layers of a magnetic tunnel junction structure coupled to an associated select transistor, as known in the related art.
Figure 2B:
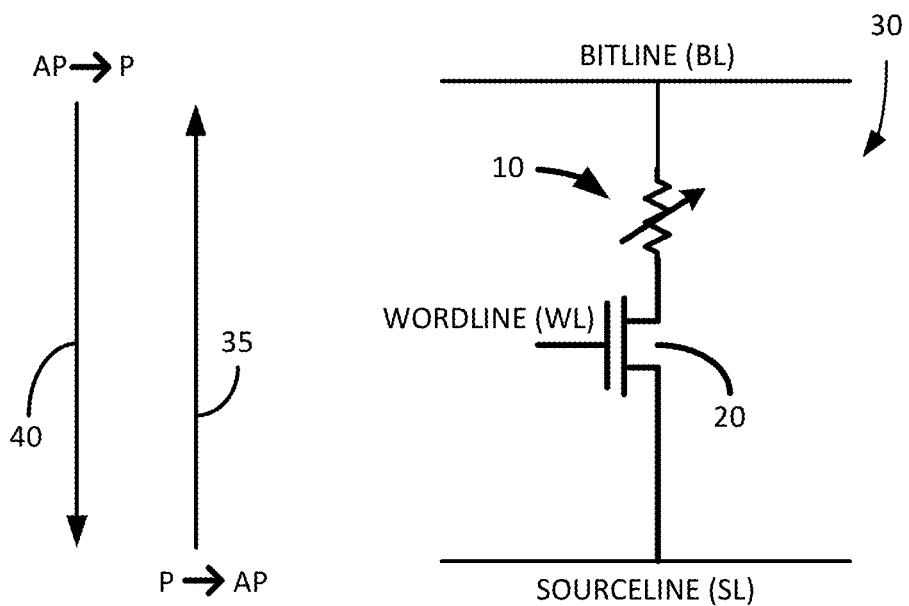
FIG. 2B is a schematic representation of the magnetic tunnel junction structure and its associated select transistor of FIG. 2A, as known in the related art.
Figure 3:
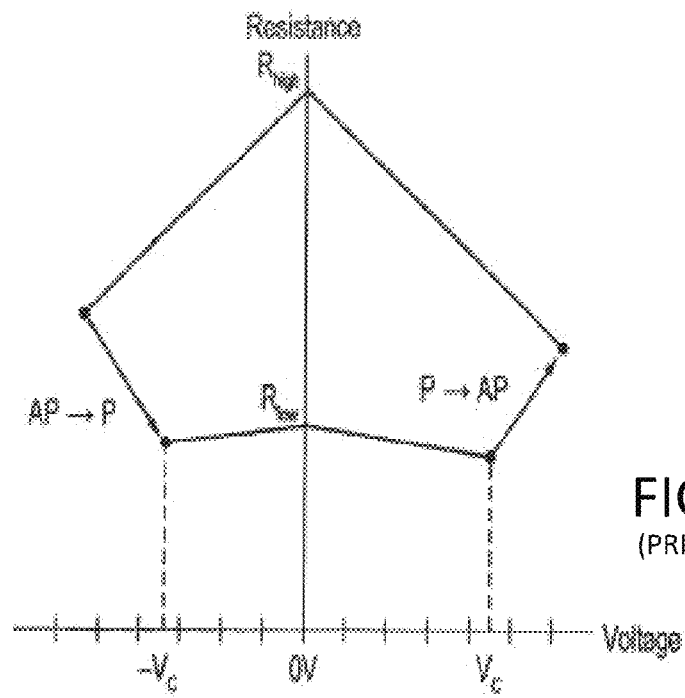
FIG. 3 is a graphical illustration showing the variation in the resistance of the magnetic tunnel junction structure of FIG. 2A in response to applied voltages, as known in the related art.
Figure 4A:
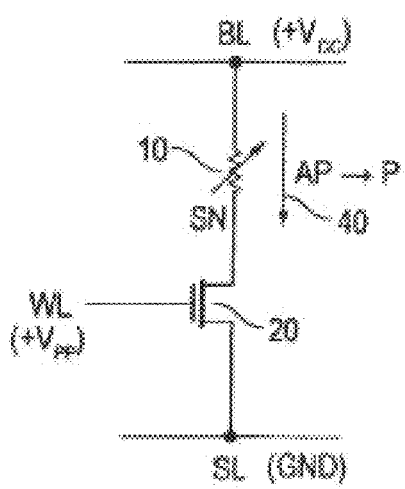
FIG. 4A is a schematic diagram showing a magnetic tunnel junction structure being programmed to switch from an anti-parallel state to a parallel state, as known in the related art.
Figure 4B:
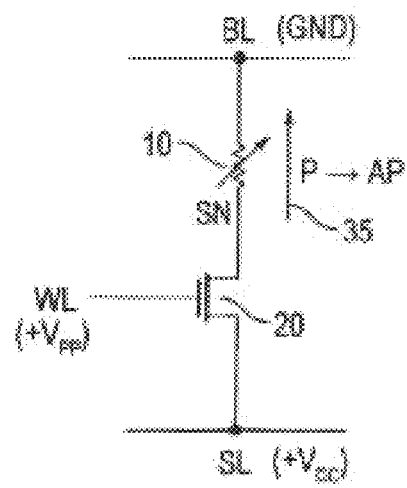
FIG. 4B is a schematic diagram showing a magnetic tunnel junction structure being programmed to switch from a parallel state to an anti-parallel state, as known in the related art.
Figure 5:
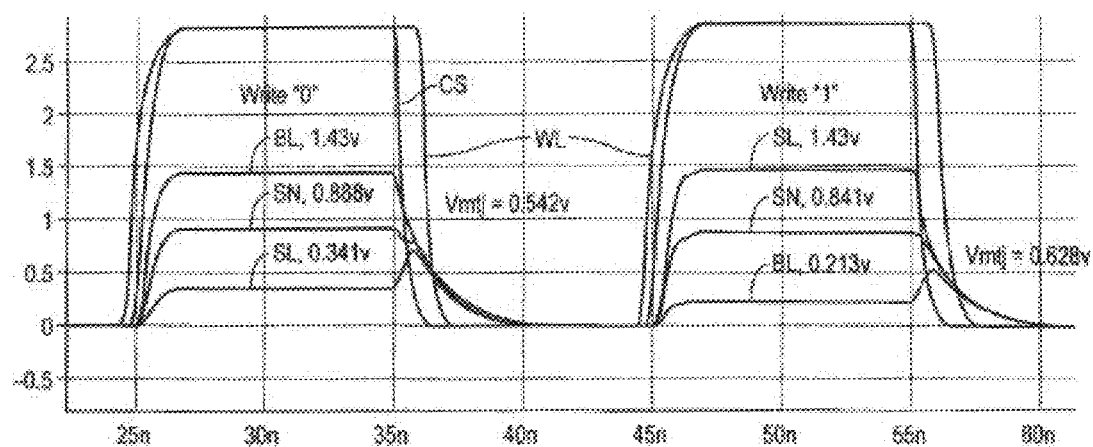
FIG. 5 is a timing diagram representing a number of signals associated with a magnetic random access memory during write "0" and write "1" operations, as known in the related art.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first circuit could be termed a second circuit, and, similarly, a second circuit could be termed a first circuit, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

During a write operation, a memory cell may exhibit randomly different write times at different occasions even under the same, stable conditions. Such behavior may not be the result of wear-out mechanisms that could have been screened out during factory testing, but may instead result from probabilistic behavior of the memory cell's write characteristics. Memory cells determined to be defective for non-probabilistic reasons can be removed from a cell population during testing and repair operations performed at the factory. For instance, certain defects can be repaired by replacing defective cells with on-chip redundant cells during a redundancy operation. Where the defects cannot be repaired, the bad chips can be scrapped. However, even after testing and repair operations, the remaining memory cell population may still exhibit probabilistic behavior that affects the reliability of the memory chip.

After factory testing and repair has been completed, the chip is shipped out and incorporated in a device for use by an end-user. When the chip is in regular use by the end-user, the memory system may be able to flag and repair address locations corresponding to defective cells, such as those which are slow to write, by mapping them out of the usable address space. This process of mapping out memory locations of slow-to-write cells, however, results in a dwindling number of usable address locations over time, since the mapped out cells are not expected to recover to normal and their address locations are therefore permanently rerouted. Thus, defective memory operations resulting from probabilistic cell behavior would result in either low factory yield due to depleting limited redundant elements, or depletion of the address space usable by an end-user over time in the field.

In particular, during a write operation, a memory cell may exhibit randomly different write times at different occasions under stable environmental conditions. At different times, therefore, this behavior may produce an error during writing data into a memory system, even for a cell population determined to be otherwise defect free. A new memory circuit solution is required to overcome this probabilistic cell behavior problem.

In accordance with certain embodiments of the present inventive principles, a tag memory or non-volatile memory (NVM) stores address locations of data which fail to write properly due to probabilistic behavior. The stored tag address locations can be used to rewrite and correct the data after the user initiated regular write operation. Alternatively, a write, hidden from the user, can be performed during the user initiated regular write operation when the cell fails to write in the allocated time due to probabilistic behavior.

Figure 6A:
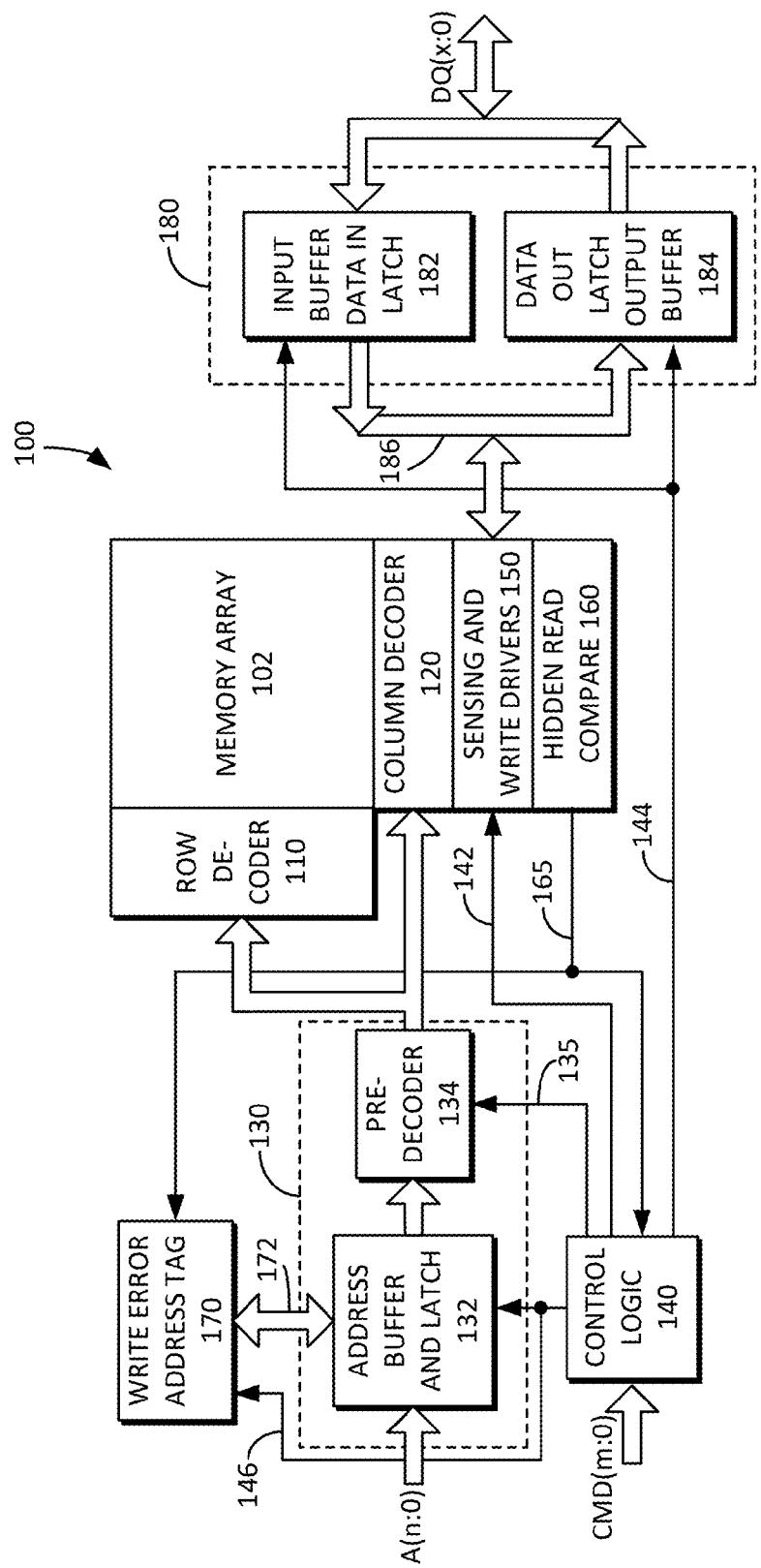
FIG. 6A is a schematic block diagram of a memory system and associated circuitry, in accordance with an inventive concept.

FIG. 6A is a schematic block diagram of a memory system and associated circuitry 100, in accordance with an inventive concept. Referring to FIG. 6, the memory system 100 includes a memory array 102, a row decoder 110, a column decoder 120, an addressing circuit 130, a control logic 140, sensing and write drivers 150, a hidden read compare section 160, a write error address tag memory 170 (alternatively referred to herein as tag memory) and a data input output section 180.

The addressing circuit 130 further includes an address buffer and latch 132 and a pre-decoder 134. The data input output (I/O) section 180 further includes an input buffer data-in latch 182 and a data-out latch output buffer 184. It should be noted the terms sensing and reading may be used interchangeably herein, as are the terms sense and read.

The memory array 102 includes many columns, wordlines and memory cells located at the intersections of the columns and wordlines. Each memory cell is capable of storing a data bit. The memory cell may, for example, be a DRAM, SRAM, ROM, PROM, EEPROM, FLASH, FeRAM, PCRAM, MRAM, STT-MRAM, RRAM or other type of memory cell depending on the technology. By way of example, but not limitation, some of the embodiments described below will use STT-MRAM cells, as have been previously described.

The row decoder 110 selects and drives one of the wordlines determined by its input bus driven by the pre-decoder 134. Similarly, the column decoder 120 selects and drives one of the columns determined by its input bus also driven by the pre-decoder 134. The pre-decoder 134 drives the row and column decoder input bus signals responsive to the address bus signals from the address buffer and latch 132 and responsive to the address (ADDR) enable signal 135 from the control logic. The address buffer and latch 132 operates responsive to the signals from the address bus A(n:0) and is capable of latching the n+1 address signals received from outside the memory system corresponding to the location of a desired data bit. The address buffer and latch 132 also operate responsive to the control logic 140.

The control logic 140 receives signals from outside the memory system on a command bus CMD(m:0) and operates responsive to an error flag 165 from hidden read compare section 160. The control logic sends various signals, which are used to control the operation of the memory system. The signals include, for instance: a read write (R/W) control signal 142, which is sent to the sensing and write drivers 150, a data latch control (DQ control) signal 144, which is sent to the data I/O 180, and a control signal 146, which is sent to the write error address tag memory 170.

The write error address tag memory 170 sends and receives address signals from address buffer and latch 132 via a bidirectional bus 172 responsive to the control logic 140 and responsive to the error flag 165, as will be described in greater detail below. The write error address tag memory 170 is preferably capable of storing addresses of memory cells that exhibit probabilistic behavior and therefore do not write successfully during a write cycle of the memory system. The addresses stored in the write error address tag memory 170 represent stored data bits in memory that can be logically inverted to properly represent the data originally input to the memory system.

The write error address tag memory of this embodiment may, for example, be a non-volatile memory, FIFO, SRAM or D flip-flop registers. The memory cells in the write error address tag memory 170 may be based on the same technology type and/or design as the memory cells in the memory array 102 or may be of different technology type and/or design. The width of the memory in write error address tag memory 170 may correspond to the number of address signals (i.e., n+1). The depth of the memory in write error address tag memory 170 may depend on the number of error correctable bits desired or required for each re-write operation. For example, if the probabilistic write error rate is high for the average memory cell population, the write error address tag memory depth may be chosen to be larger than if the error rate is small.

The input buffer data-in latch 182 receives and latches data on a bidirectional bus DQ(x:0) from outside the memory system and transmits that data via a separate bidirectional bus to the hidden read compare section 160, which can be integrated between the sensing circuit and write driver as will be explained in more detail below. The data-out latch output buffer 184 receives and latches data on a bidirectional bus 186 from the sensing and write drivers 150 and transmits data via the bidirectional bus DQ(x:0) to outside the memory system.

Figure 6B:
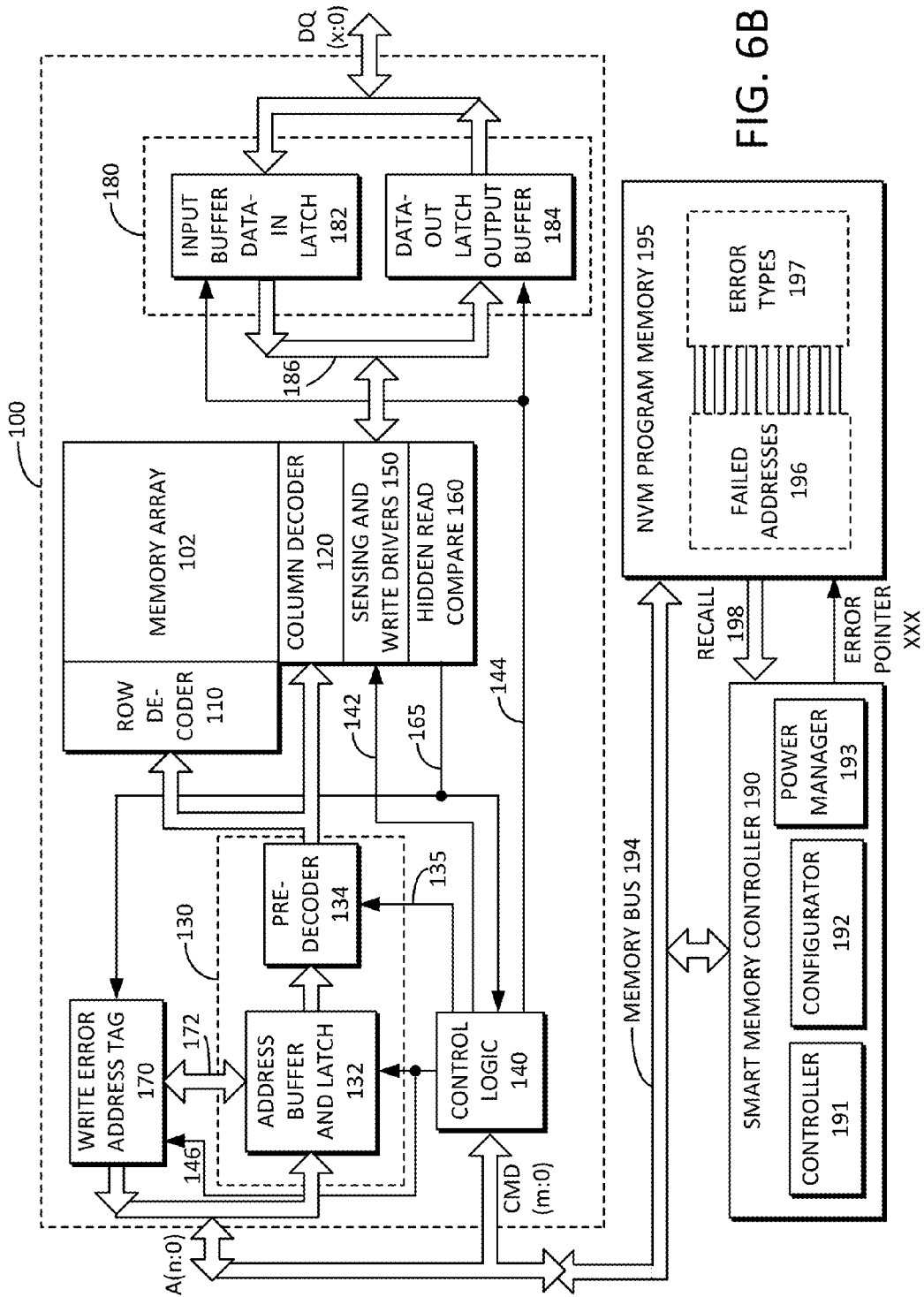
FIG. 6B is a schematic block diagram of a smart memory system and associated circuitry, including a non-volatile memory (NVM) program memory and memory controller, according to principles of the inventive concept.

FIG. 6B is a schematic block diagram of an error detection and address table generation circuit similar to that shown in FIG. 6A, but which incorporates further principles of the inventive concept. Specifically, unlike the circuit shown in FIG. 6A, the error detection and address table generation circuit of FIG. 6B further includes an external smart memory controller 190 and non-volatile memory (NVM) program memory 195. The smart memory controller 190 can be referred to as a smart memory processor, a memory processor, or a smart controller, and such terms are used herein interchangeably. The NVM program memory 195 is in addition to the Write Error Tag Memory 170 of the previous embodiment, which, in this case, can be a FIFO. The NVM program memory 195 can be referred to herein as a non-volatile error retention memory.

Referring to FIG. 6B, the smart memory controller 190 can include a memory controller 191, memory configurator 192, and power manager 193. The smart memory controller 190 can communicate with the smart memory 100 and the NVM memory 195 through a memory bus 194. The system may be configured to dynamically monitor memory system failures and record fail locations as well as fail/error types by storing them in the non-volatile memory (NVM) 196. Specifically, the write error address tag information temporarily stored in the FIFO 170 can be transferred to the NVM program memory 195 via the memory bus 194 under the control of the memory controller 190. The NVM program memory 195 can accumulate a database 196 of the failed memory addresses as well as a tabulation 197 of the error types. The system can then recall the fail location (i.e., RECALL 198) from the NVM table and perform an appropriate fix operation based on the type of failure. The memory configurator 193 can be used to map out address locations with unrepairable errors.

By enabling a failed memory address to be stored in the tag memory 170 and/or the NVM program memory 195 along with the type of data error 197, the memory controller 190 can be configured to access the tag or NVM program memory and to perform an appropriate fix operation for that address location based on the type of error indicated. These fix operations can include, for instance, a memory rewrite, an address reconfiguration to isolate a failed memory location, a memory repair operation, or other appropriate fixes. Memory monitoring, repair, correction, and re-assignment can therefore be performed by a smart memory controller according to principles of the present inventive concept. ECC, anti-fuse repair, error masking, read-compare-write, weak bit refresh, and other error correction technologies can be implemented in the smart memory system to enhance data stability and reduce error rates.

Figure 7:
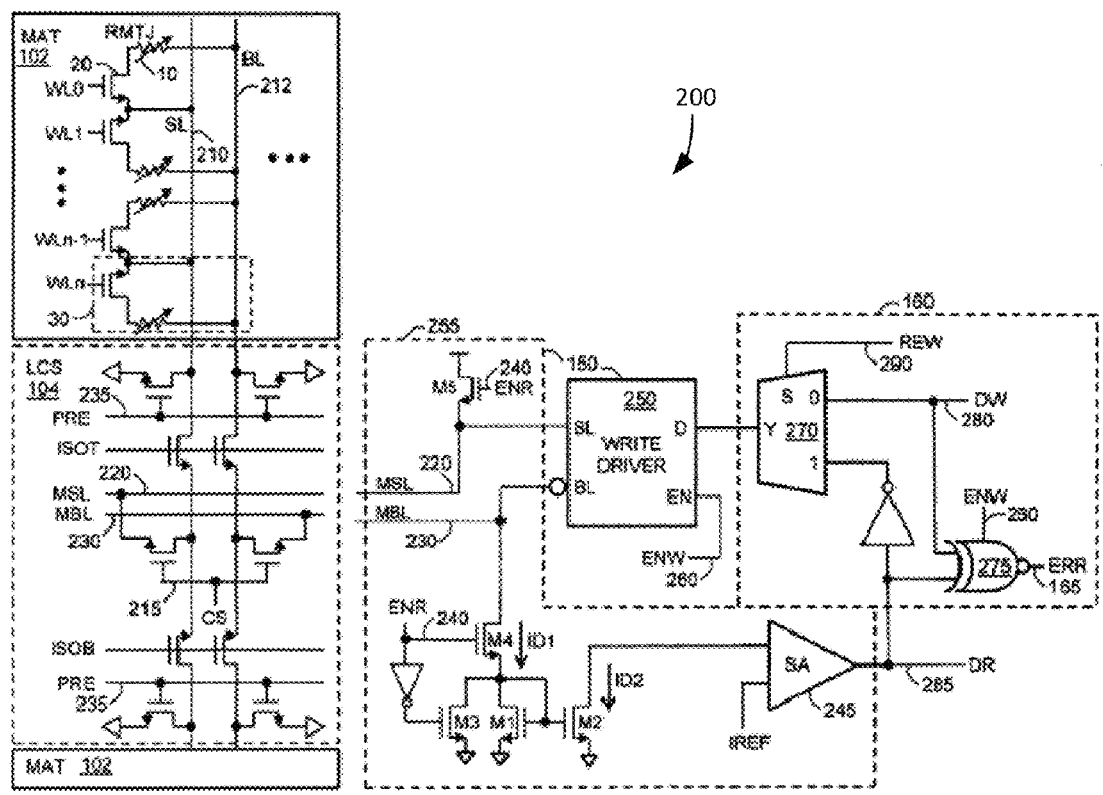
FIG. 7 is a schematic circuit diagram representing portions of a memory system and associated writing and reading circuitry, in accordance with inventive concepts.

FIG. 7 is a schematic block and circuit diagram illustrating portions 200 of the memory system 100 and associated writing and reading circuitry, in accordance with inventive concepts. The circuitry 200 includes a memory array tile (MAT) 102, a local column select circuit (LCS) 104, sensing and write drivers 150, and a hidden read compare 160. Although this embodiment includes STT-MRAM cells, it is not limited thereto, and may include other memory types as discussed above.

Referring to FIG. 7, the MAT 102 includes a number of STT-MRAM cells 30 whose select transistors are coupled to wordlines (WL0-WLn), which are driven by the row decoder 110 as described above in connection with FIGS. 6A and 6B. The STT-MRAM cells are also coupled to a source line (SL) 210 and bit line (BL) 212 pair corresponding to one of the columns in the memory array 102. The MAT 102 includes a plurality of SL and BL pairs, which are selectable by LCS 104. The LCS 104 includes a selection circuit having pairs of n-channel select transistors, which couple a selected SL and BL pair in MAT 102 to a source line and bit line pair (e.g., MSL 220 and MBL 230) in the LCS 104 under the control of a column select signal (CS) 215, a precharge signal (PRE) 235, an isolation top signal (ISOT), and an isolation bottom signal (ISOB).

There are two separate memory arrays 102 shown in this embodiment, arranged on the top and bottom, respectively, of the LCS 104. The LCS 104 determines which of the adjacent MATs 102 to select by enabling one of the respective ISOT or ISOB signals. In the example shown in FIG. 7, the top MAT is selected by enabling ISOT and disabling ISOB. One of the SL and BL pairs is then selected by the CS signal (as driven by the column decoder), to couple the selected SL and BL pair in the top MAT array to the respective MSL and MBL lines. The SL/BL pair and corresponding MSL/MBL pair are then ready to perform a write or read operation for the selected memory cell when the precharge signal PRE is disabled.

MSL 220 and MBL 230 are coupled from LCS 104 to a sensing circuit 255 (alternatively referred to herein as a read block) and write driver 250 (alternatively referred to herein as a write block). In an alternate embodiment (not shown) the SL and MSL signals may be omitted from the column and associated circuitry to provide a single line column for memory cells that do not require a complementary column pair to function, and whose sources are coupled to ground within the MAT (such as in some ROM, PROM, EPROM, EEPROM, and Flash, as is commonly known in the art).

As is shown in FIG. 7, the write driver 250 is coupled to an enable write signal (ENW) 260 driven by the control logic and an output (Y) from hidden read compare 160 coupled to the data (D) input of the write driver. During a write mode operation, the write driver 250 drives the MSL and MBL lines (and the respective SL and BL line pair) in complementary fashion as will be described in detail later under control of ENW. When ENW is disabled, write driver 250 does not drive the MSL and MBL lines.

The sensing circuit (i.e., read block) 255 is enabled by an enable read (ENR) 240 signal and includes a transistor M5 coupled to the power supply and a transistor M3 coupled to the ground. M5 and M3 are coupled to the ENR signal and its complement, respectively. The ENR and ENW signals are not enabled simultaneously. When ENR is enabled high, transistor M3 is turned off, while a transistor M4, controlled by ENR is turned on and passes the MBL signal to a current mirror M1 and M2, and transistor M5 couples MSL 220 to the power supply. Current ID1 flows in MBL through transistor M4 to transistor M1 of the current mirror.

A sense amplifier (SA) 245 is coupled to a current reference signal IREF and a second current ID2, which flows through the second transistor M2 of the current mirror. The SA compares the two currents (ID2 with IREF) and issues a data-out signal (DR) on a data read line 285. The data read line 285 is coupled via the bidirectional bus (see FIGS. 6A and 6B) to the data-out latch output buffer 184 and to the hidden read compare 160. When ENR is disabled low, M4 isolates MBL 230 from the current mirror and M3 couples the current mirror input to a ground voltage. The SA 245 may also be placed locally within MAT 102 or placed with the global sense amps and global write drivers (not shown).

The hidden read compare 160 (alternatively referred to herein as a compare block) can include an exclusive disjunction gate (XNOR) 275, an inverter, and a multiplexer 270. The hidden read compare is controlled by ENW 260 and a re-write (REW) signal 290, both sent from control logic 140 (see FIGS. 6A and 6B). The inputs to the XNOR gate 275 are the data read signal (DR) 285 from the sensing circuit 255 and the data write signal (DW) 280 from input buffer data-in latch 182, responsive to ENW 260. The multiplexer selects which of its two inputs, an inverted DR 285 signal or the DW signal, to pass through from its output Y to the input D of the write driver responsive to REW. The compare block 160 may alternatively be placed locally within MAT 102 or placed with the global sense amps and global write drivers.

Figure 8:
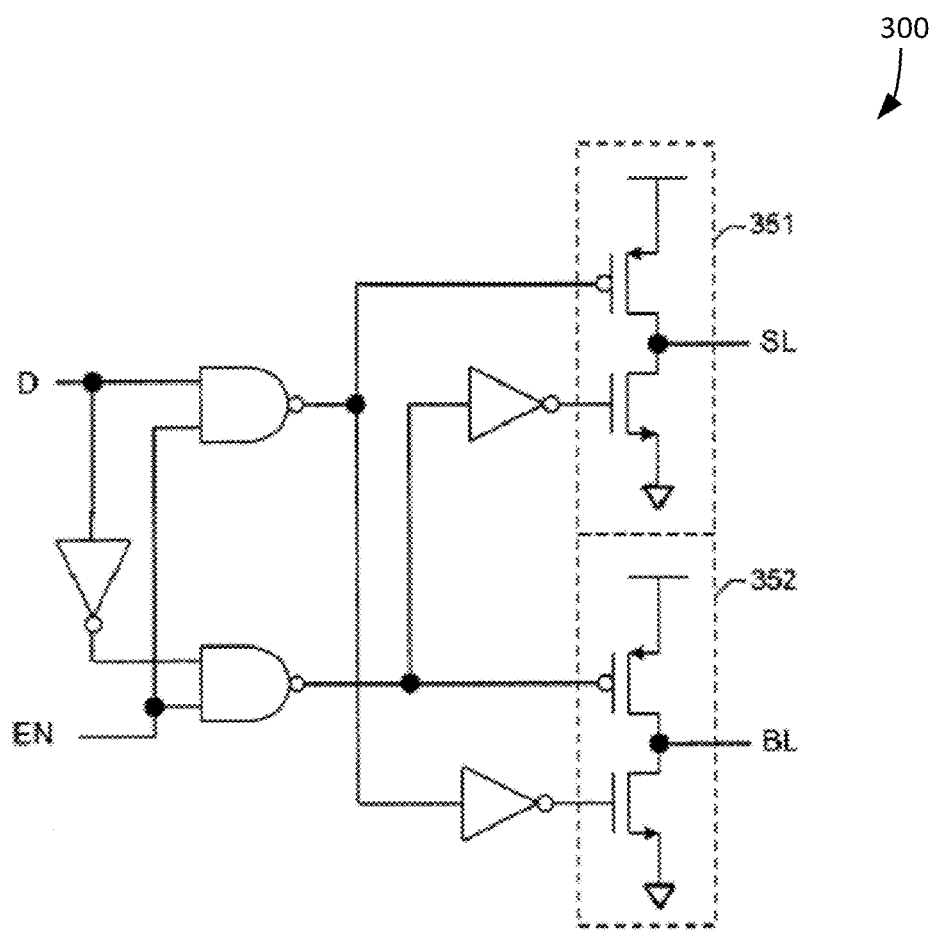
FIG. 8 is a schematic circuit diagram representing additional portions of a memory system and associated writing circuitry, in accordance with inventive concepts.

FIG. 8 is a schematic circuit and logic diagram illustrating one embodiment of a write driver 300 of the memory system and associated writing circuitry 100, in accordance with inventive concepts. The write driver circuitry 300 of FIG. 8 can, for instance, supply the write driver 250 of FIG. 7. Referring to FIGS. 7 and 8, the write driver 300 (250) can include two inverter drivers 351 and 352 driving SL and BL signals respectively under control of ENW 260. The signal line (SL) is coupled to MSL, while an inverted bit line signal (BL) is coupled to MBL. When EN (ENW) is enabled high, an inverted version of input D from the hidden read compare 160 is coupled to the BL signal while a non-inverted version of input D is coupled to the SL signal, such that the BL and SL signals are logical complements. When EN (ENW) is disabled low, the transistors in both inverter drivers 351 and 352 are off, independent of the state of input D, and control of the MSL and MBL lines reverts to the sensing circuits.

Each write cycle can be followed by a hidden read cycle of the same memory location. The data from the hidden read operation (data-out) can then be compared to the data bit value which was just being written. If the data matches, the write cycle is finished. If the data doesn't match, the output of the XNOR will go active low and an ERROR flag is generated. The memory address for this location can then be "tagged" or stored in the write error address tag memory for a later re-write operation.

In accordance with one inventive aspect, the memory array described above can also include circuitry for carrying out the following operations: latching the address of the data bit into the addressing circuit; latching the data bit into the data input output circuit; writing the data bit into the memory array at the address of the data bit; reading a data-out bit from the memory array at the address of said the bit; comparing the data bit with the data-out bit to determine if the data bit equals the data-out bit; writing the address of the data bit in the write error address tag memory if the comparing step determines the data bit does not equal the data-out bit; and not writing the address of the data bit in the write error address tag memory if the comparing step determines the data bit equals the data-out bit.

Figure 9A:
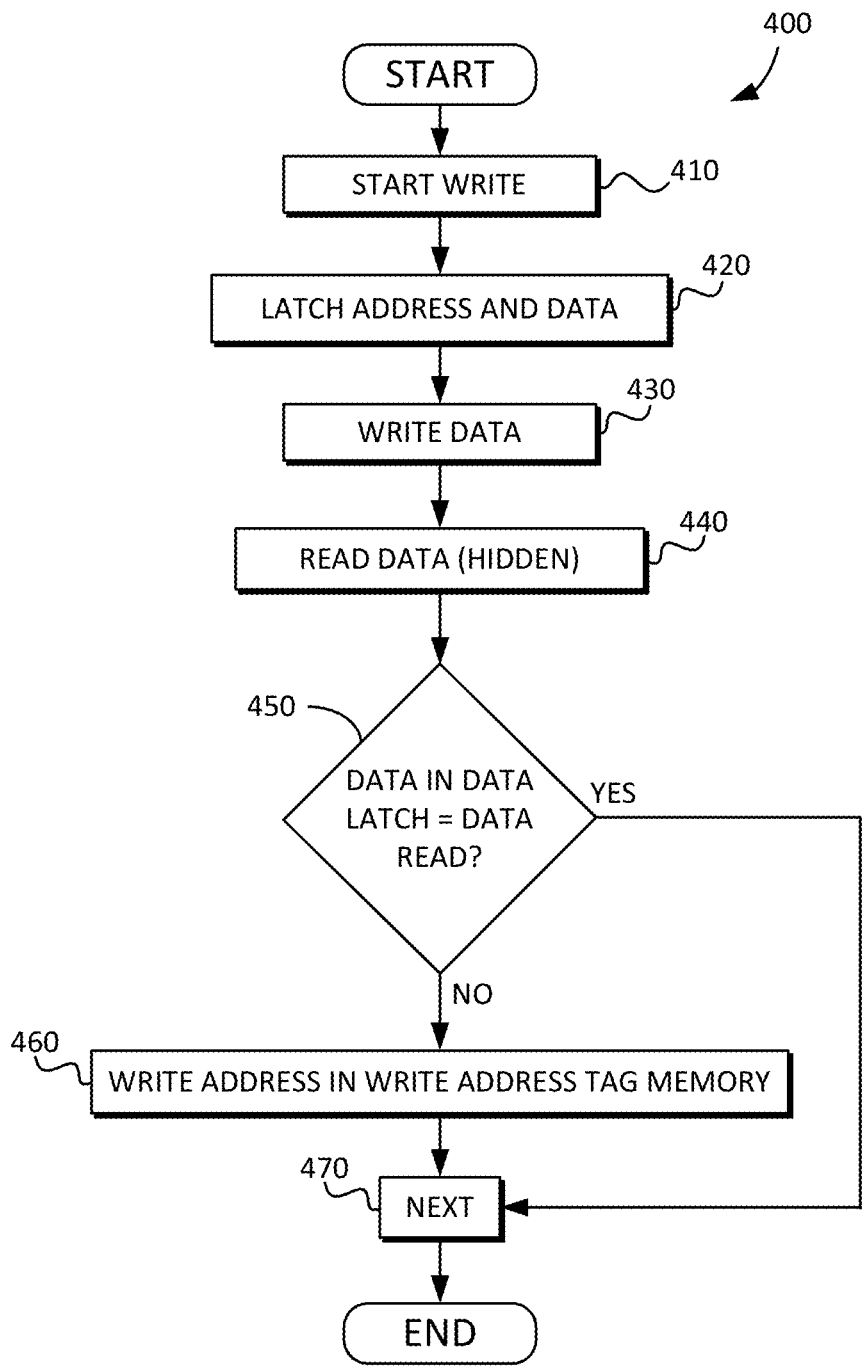
FIG. 9A is a flow chart illustrating steps of a writing method of a memory system, in accordance with inventive concepts.

FIG. 9A is a flow diagram 400 illustrating various steps of a writing method of a memory system. Referring to FIGS. 7 through 9A, after the start of a write operation 410, during a latch address and data step 420, the data (alternatively referred to herein as first data) is latched in input buffer data-in latch 182 and passed through multiplexer 270 in the hidden read compare section 160 to the D input of the write driver 250. Also during the latch address and data step 420, the address of the data bit is latched in the address buffer and latch 132 and passed through to the pre-decoder 134, which drives the input buses for the row and column decoders, which in turn select a wordline and column in the memory array. The write data step 430 writes the data into the memory cell at the selected address in the memory array by enabling ENW.

Following the write data step 430, a hidden read data step 440 is executed on the same address location passing a data-out bit to the hidden read compare section 160. The read is considered hidden since it is performed automatically as part of the write operation without having to instruct the memory system via the CMD bus. Next, during a compare step 450, the data bit from the input buffer data-in latch 182 (i.e., the "true" or first data bit) is compared against the data-out bit from the SA 245 (i.e., the data bit written to memory, which may or may not have written successfully, and alternatively referred to herein as second data) to determine if the first data bit equals the second data bit. This logical comparison is performed by the exclusive disjunction or XNOR gate 275 in the hidden read compare section 160. If the first data bit equals the second data bit, the write operation was successful and the next operation 470 can proceed. However, if the first data bit does not equal the second data bit, the exclusive disjunction or XNOR gate sets error flag (ERR) 165, which signals the controller 140 to pass the "tagged" address from the address buffer and latch over the bidirectional bus to the write error address tag memory 170, where the address is written (during step 460) and stored therein until a re-write operation can be performed as will be further described below. The tag memory storage operation 460 is a transparent operation and can be easily done at the beginning of the next memory cycle such that it does not delay the next memory operation 470.

In another aspect of the inventive concept, the total write cycle may be extended to include an additional hidden write operation. In this case, the write correction operation (re-write) may be transparent to the user. The write timing specification can be made to include this transparent re-write time. Therefore, the write cycle time may be the same whether or not a re-write is required.

Figure 9B:
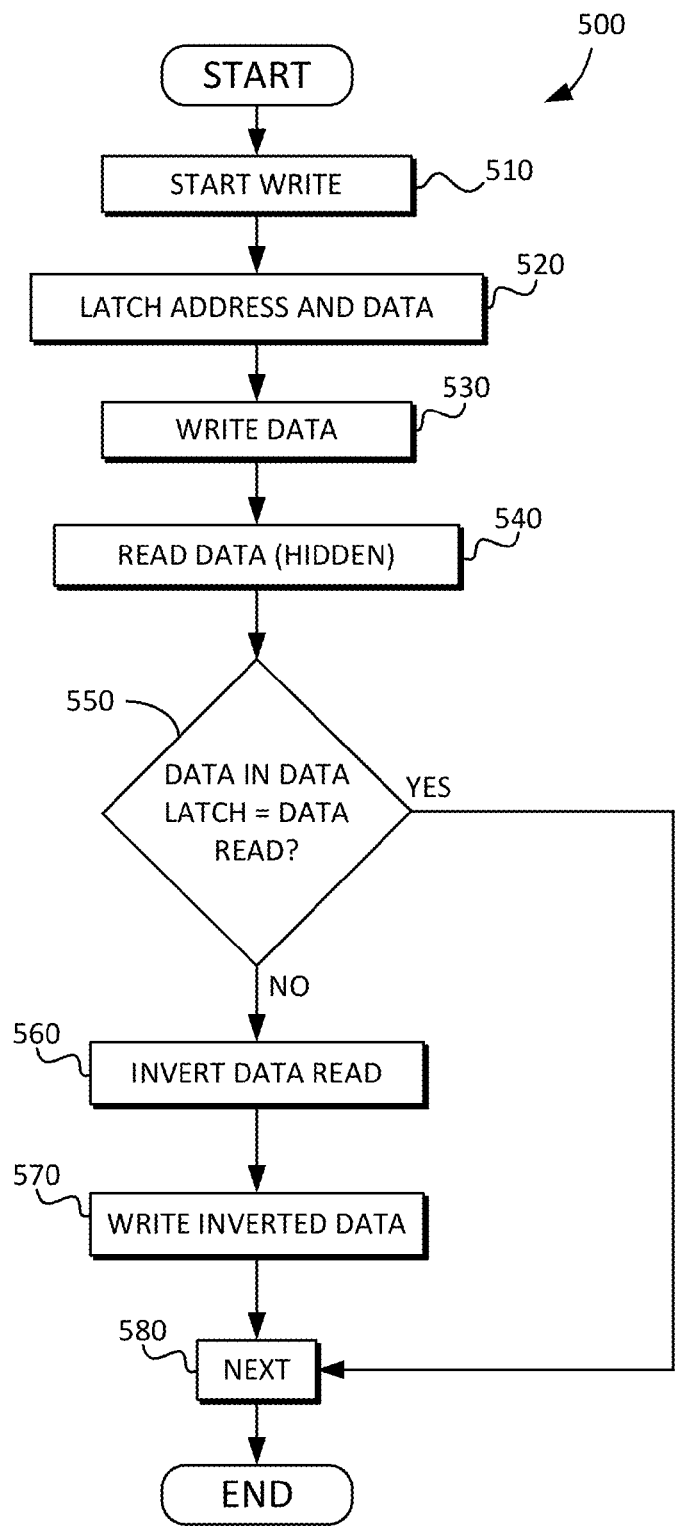
FIG. 9B is a flow chart illustrating steps of a writing method of a memory system, in accordance with inventive concepts.

FIG. 9B is a flow diagram 500 illustrating various steps of a writing method of a memory system, in accordance with inventive concepts. The steps 510 through 550 of FIG. 9B are the same as steps 410 through 450 in FIG. 9A and will therefore not be described again. In step 560, however, the data-out at the current address location in the memory array is passed to the SA output DR 285. Next, an invert data read step 560 is performed by the inverter in the hidden read compare section 160 to invert the data-out bit. The inverted data-out bit is then directed to the D input of the write driver 250 via the multiplexer 270 responsive to the REW signal 290 from the control logic. A write inverted data step 570 is then performed to write the now corrected inverted data-out bit into the current address in the memory array. The next 580 operation can then be performed.

A re-write operation will now be explained in greater detail. Depending on the memory system specification, the tagged address from the defective write operation can be used to re-write the memory cell located at the tagged address, at a convenient time when the processor or system periphery is not accessing the memory. During the re-write cycle, the data in the tagged address can simply be inverted. To invert the data, the memory bit must be read first using the hidden read feature and the opposite data can then be written into the cell. Thus, the original writing error caused by the cell's previous probabilistic lengthy write behavior can be corrected.

Rather than wait to perform the re-write operation at a later time, the data can instead be corrected immediately in a handshaking system where the memory sends a "halt access" signal to the processor or master system while the re-write cycle is in progress. A "re-write complete" signal can then be sent to the master system once the re-write operation is completed. Additional handshaking systems for ensuring a proper write operation will be discussed in further detail below.

In accordance with yet another embodiment, the memory array described above can also include circuitry for carrying out the following operations: loading the address of the data bit from the write error address tag memory into the addressing circuit; reading a data-out bit in the memory array at the address of the data bit; inverting the data-out bit in the hidden read compare circuit; and, writing the inverted data-out bit into the memory array at the address of the data bit.

Figure 10:
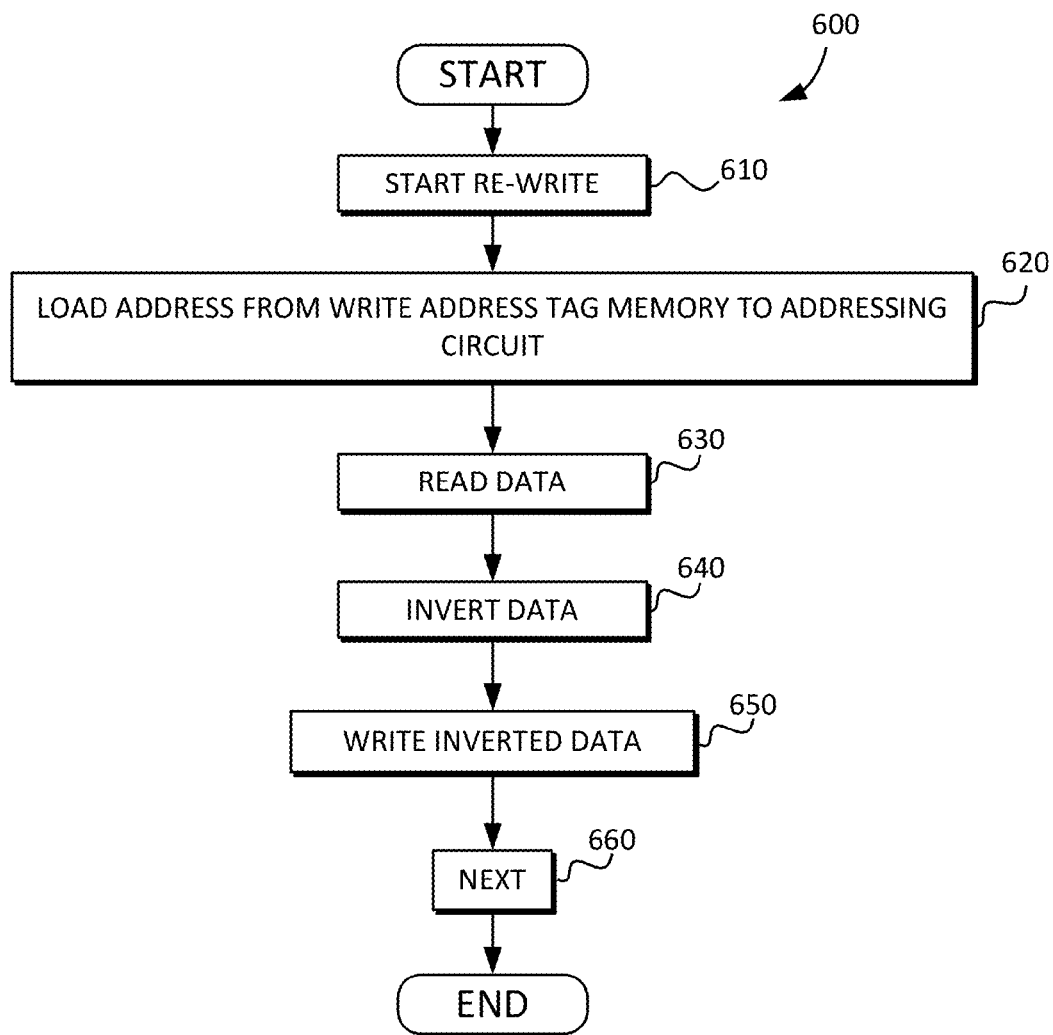
FIG. 10 is a flow chart illustrating steps of a re-writing method of a memory system, in accordance with inventive concepts.

FIG. 10 is a flow diagram 600 illustrating various steps of a re-writing method of a memory system, in accordance with inventive concepts. Referring to FIG. 10, after the start of a re-write operation 610, during a load error address from write address tag memory to addressing circuit step 620, the "tagged" address from write error address tag memory 170 is loaded over the bidirectional bus into address buffer and latch 132. Then, the data at the previously "tagged" address is read out during a read data 630 step. The data-out at the "tagged" address location in the memory array is passed to SA output DR 285. Next, an invert data step 640 is performed by the inverter in the hidden read compare 160 to invert the data-out bit. The inverted data-out bit is then directed to the D input of the write driver 250 via the multiplexer 270 responsive to the REW signal from the control logic. A write inverted data step 650 is then performed to write the now corrected inverted data-out bit into the previously "tagged" address in the memory array. Then the next memory operation can then be performed in step 660. The memory space taken up by the previously "tagged" address stored in the write error address tag memory can now be made available to new "tagged" addresses in subsequent write cycles.

Figure 11:
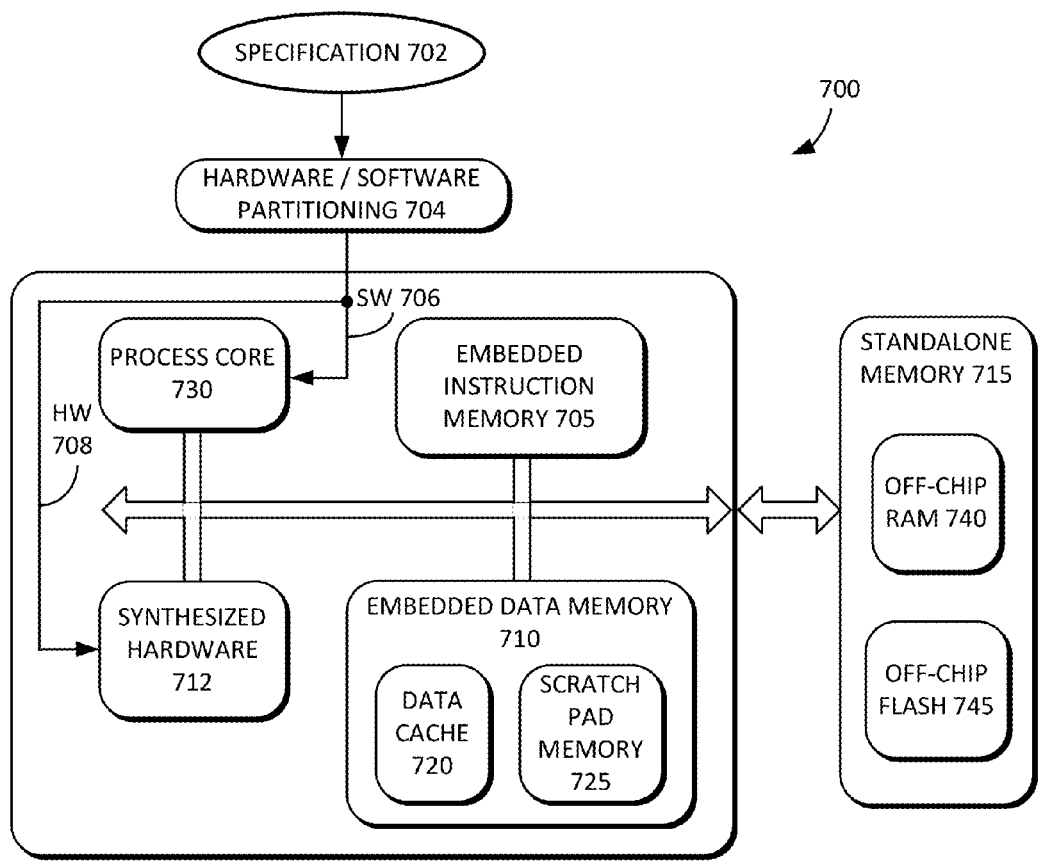
FIG. 11 is a schematic block diagram of a conventional memory system.

FIG. 11 is a schematic block diagram of a conventional memory system 700. Referring to FIG. 11, the conventional memory system 700 is provided using specification 702 and hardware/software partitioning section 704, which distributes software functionality 706 to the processor core 730 and hardware functionality 708 to the synthesized hardware section 712. The memory system 700 may consist of a device having a small amount of embedded memory, such as embedded instruction memory 705 and data memory 710, and a larger amount of memory provided as a separate, standalone memory device 715, such as a separate RAM 740 or Flash memory chip 745 or chip package. The embedded memory can include both instruction memory 705 for providing program instructions to the processor, and data memory 710 (including both data cache 720 and scratch pad memory 725) for storing small amounts of data that are being transferred between the device and the standalone memory 715, or that are being used for computations or other processes being performed by the processor core 730.

Conventional memory systems have typically relied on error correction processes performed by a factory to catch and fix memory errors before implementation in an end-user device. Such systems are therefore not well-adapted for use with memories exhibiting probabilistic characteristics (e.g., PCRAM, MRAM, and RRAM), which may result in higher error rates and slower read/write times.

Figure 12:
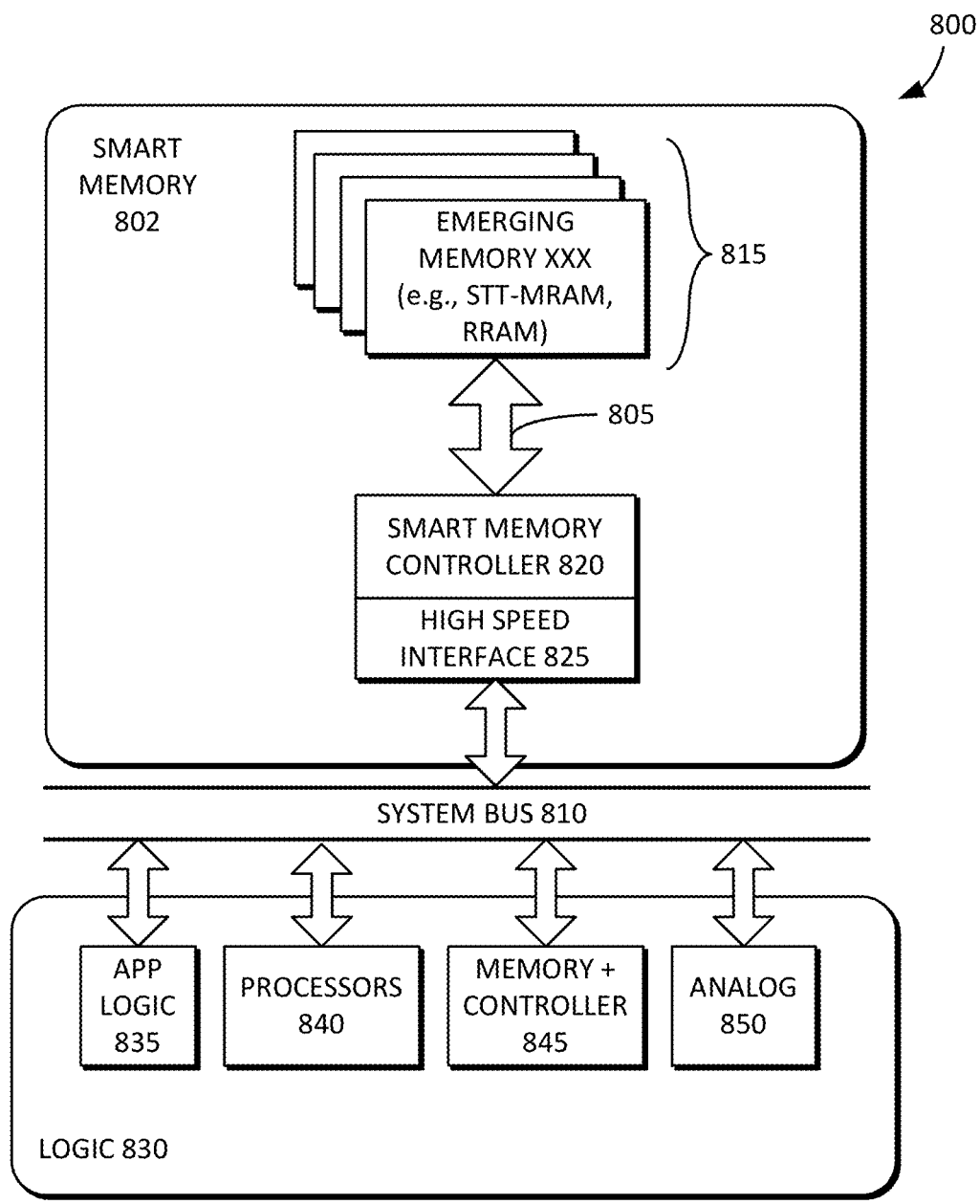
FIG. 12 is a schematic block diagram of a smart memory system constructed according to inventive concepts.

According to features and principles of the present inventive concepts, a smart memory system preferably allows memories with high error rates and slow read/write times relative to a logic processor to work reliably and seamlessly. FIG. 12 is a schematic block diagram of one embodiment of a smart memory system 800 constructed according to principles of the present inventive concept. Referring to FIG. 12, the smart memory system 800 can include smart memory 802, which may be configured to provide a handshaking interface 805 with an ultra-wide input output (I/O) between the memory 815 and smart memory controller 820 to ensure successful read and write operations. More specifically, a common asynchronous memory bus 810 can be provided with acknowledge signaling to guarantee write and read operation successes. The common asynchronous memory bus preferably implements a handshaking procedure during both the read and write operations to ensure that the desired data has been successfully read from, or written to, the main system memory 815. In addition, the handshaking memory interface 805 can also help avoid bottlenecks and provide re-routing capabilities. Although here labeled emerging memory (STT-MRAM, RRAM) 815, the main system memory 815 can be any type of memory, including, for example, DRAM, SRAM, ROM, PROM, EEPROM, FLASH, FeRAM, PCRAM, RRAM, MRAM, STT-MRAM, RRAM or future memory types.

The smart memory system 800 can further provide various additional error rate reduction schemes, including, for example, allowing non-volatile memory bits or sectors with poor retention to be used by tagging them and performing occasional refresh operations to maintain the data stored therein. Error-correcting code (ECC), signal processing, and programmable repair operations can also be provided to reduce and correct memory errors. The smart memory controller 820 can perform re-configuration and optimization processes to ensure proper memory retention and read/write operations. A high-speed interface 825 can be included between the smart controller 820 and the system bus 810 in order to match the speed of the logic processes.

The smart memory 802 can, for instance, be implemented in or associated with a device having any one or more of multiple logic processors or other devices. In this embodiment, the device logic 830 is shown as having application logic 835, processors 840, internal memory plus controller 845, and analog device functions 850. The smart memory 802 can be configured to communicate with any one or more of the logic components through the system bus 810. Embodiments incorporating the present inventive concepts can further be configured to enable compatibility to multiple systems. Configurable address schemes can be used, for instance, which support multiple processors and peripherals, along with a programmable and memory-type independent I/O interface.

Figure 13:
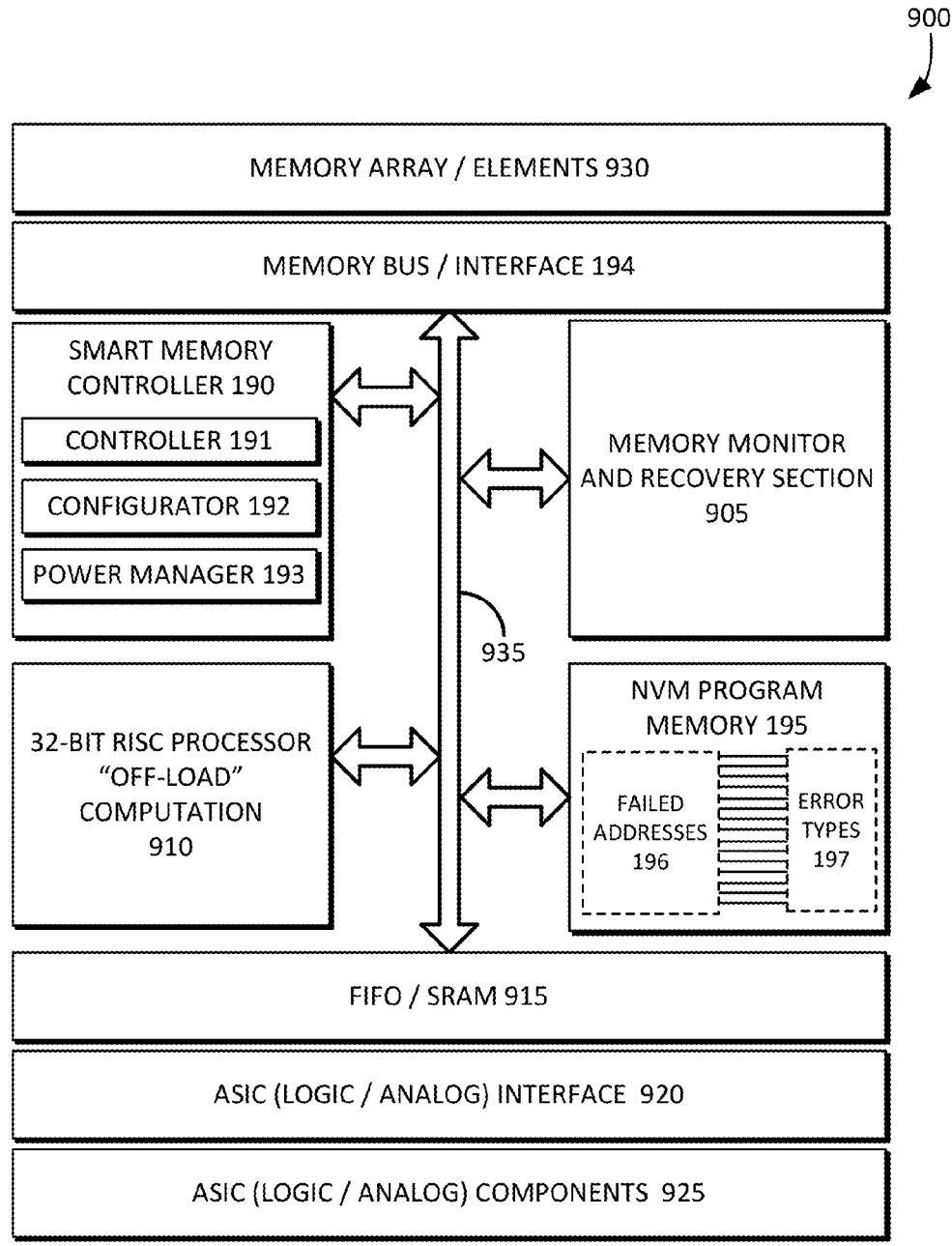
FIG. 13 is a schematic block diagram of a memory controller having an intelligent memory and logic interface according to inventive concepts.

FIG. 13 is a schematic block diagram of a memory system 900 memory controller having an intelligent memory and logic interface according to principles of the present inventive concept. Referring to FIG. 13, a smart memory controller 190 can include a memory controller 191 that oversees the communication between the user device and the memory as well as controls the other operations of the smart controller. A memory configurator 192 can also be provided to reconfigure the usable address space based on errors during field use and provide other memory configuration processes. Power manager 193 can further be included to compensate for temperature fluctuations and other power variables to provide stable supply voltages for the memory operations.

The system 900 may further be configured to dynamically monitor memory system failures and record fail locations by storing them in a memory controller non-volatile memory (NVM) 195. The system can then recall the fail location from the NVM table 196 and perform an appropriate fix operation based on the type of failure 197. These fixes can, for instance, include re-writing the data, repairing the memory, isolating the failed memory location, or other appropriate fixes. The smart memory controller 190 can, for instance, include or otherwise be associated with memory monitoring and recovery system capabilities in section 905 to diagnose memory problems and provide appropriate fixes depending on the type of errors detected. The NVM program memory 195 can be included to store address locations of defective memory cells, along with the types of errors detected. In this embodiment, the NVM program memory 195 can be utilized to store information regarding failed address locations 196 along with the type of error 197. The NVM program memory 195 can further be used to reassign addresses of failed memory locations to new memory locations. The smart memory controller 190 of the smart memory system 900 can interface with the NVM program memory 195 to perform memory tests, reassign memory addresses, perform memory refreshes, or take other appropriate action based on the error information stored in the NVM program memory 195.

Other principles can provide the smart memory controller 190 with the ability to allow the device processor to offload repetitive computations or other tasks to the smart memory system 900. For instance, an ARM, MIPs, or other desired processor combination 910 (e.g., 32-bit RISC Processor) can be incorporated in or otherwise associated with the smart controller 190 of the smart memory system 900 to perform various processing tasks to free up device resources.

More specifically, an ARM, MIPs, or other RISC processor or other types of CPU 910 can also be included in the smart memory system 900, such as in the smart memory controller 190, to perform simple and/or complex computations on the data before storing it into the main system memory via the memory interface 194. This can provide added value for the smart memory system by allowing the device processor to offload various tasks to the memory controller processor(s) 910 and thereby free up device resources for other processes. Smart memory system bus 935 may connect the various components of the smart memory system together, such as the smart memory controller 190, the off-load processor 910, the memory monitor and recovery section 905, the NVM program memory 195, the memory interface 194, and/or the FIFO/SRAM section 915.

The smart memory controller 190 can further include or otherwise be associated with a FIFO and/or SRAM memory section 915 to buffer memory transfers to the smart memory controller 190 from the device and/or logic components 920. An ASIC (logic and/or analog) interface 920 can be included to provide an interface between the smart memory controller 190 and the ASIC (logic and/or analog) components 925. The memory bus and/or interface 194 can provide the connectivity between the smart controller 190 and the memory array and/or memory elements 930.

Figure 14A:
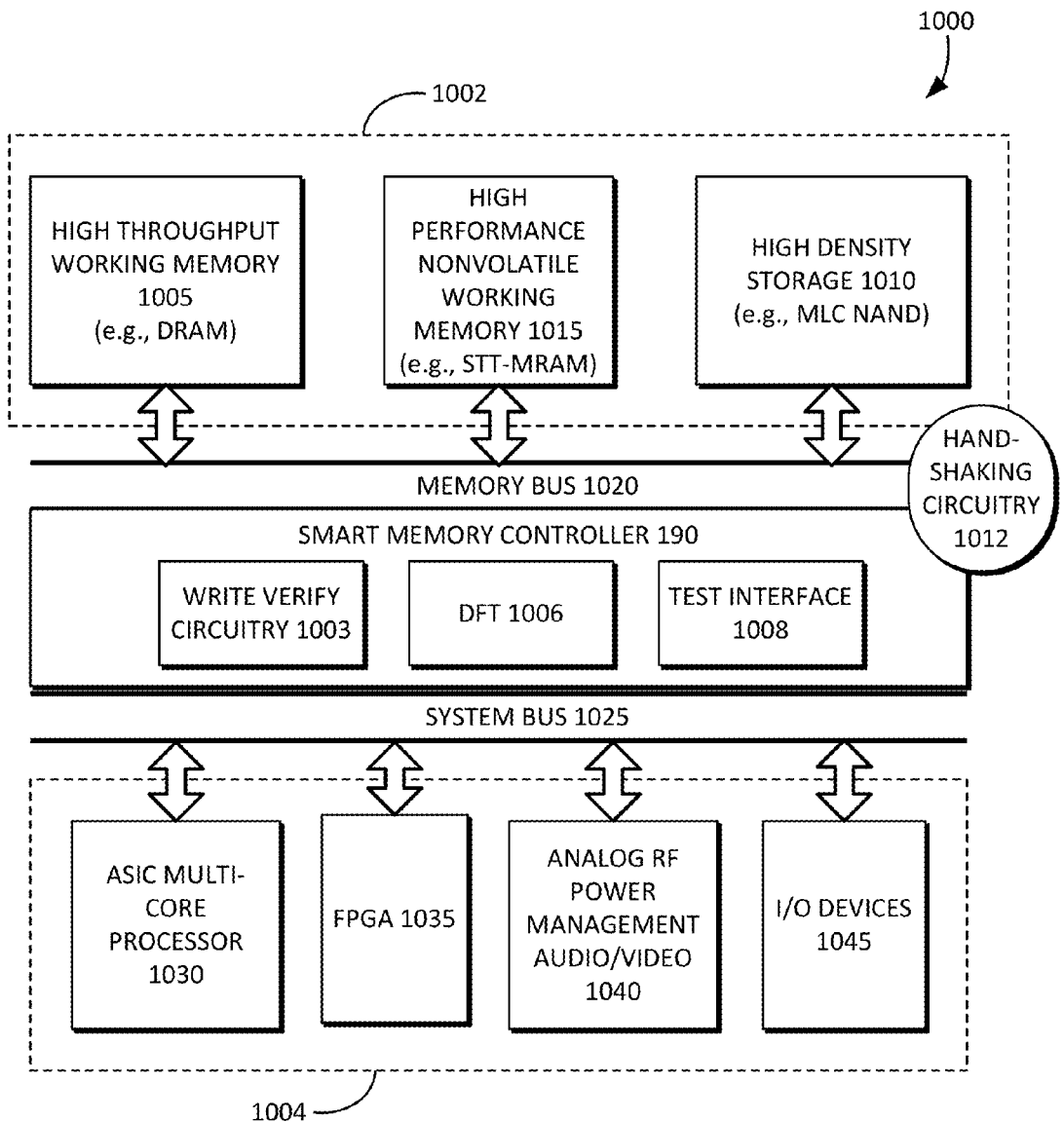
FIGS. 14A and 14B provide schematic block diagrams of embodiments incorporating a smart memory system according to inventive concepts.
Figure 14B:
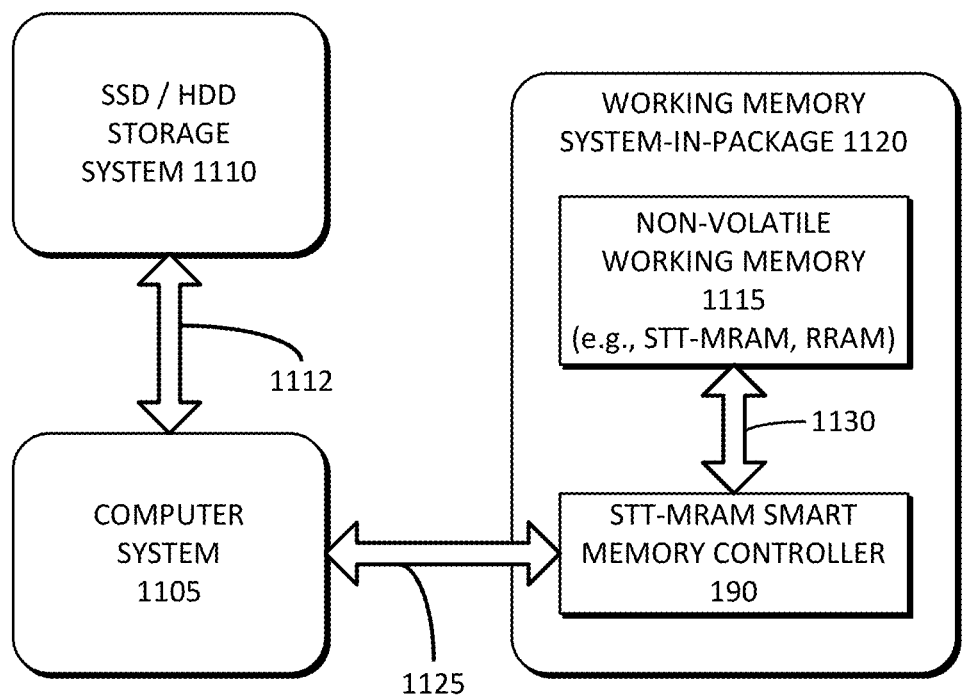

FIGS. 14A and 14B provide schematic block diagrams of devices incorporating a smart memory system according to inventive concepts. Referring to FIG. 14A, according to one embodiment incorporating principles of the present inventive concept, a smart memory system 1000 can comprise a memory 1002 including one or more memory chips (e.g., 1005, 1015, and/or 1010) fabricated using various memory processes, and a smart memory controller 190 including of one or more memory processor chips (not shown) fabricated using various logic processes. The smart memory controller 190 may, for instance, include or otherwise be associated with a common address, data, and/or control memory bus 1020 that is configured to provide an asynchronous handshaking interface between the memory array 1002 and the smart memory controller 190. The smart memory controller 190 can also include a mechanism for offloading write error tag memory data from the memory chip 1002 for analysis, and a mechanism for storing poor retention bit address information in a poor retention address table (PRAT) for future refreshing, as described above. Program logic can also be included for memory address re-configuration, as well as power management logic, as also described above.

The memory system may include a common address, data, and/or control memory bus 1020, which provides an asynchronous handshaking interface between the memory array 1002 and the smart memory controller 190. Write error tag and write/verify circuitry 1003 can also be included in the memory along with a Design for Test (DFT) circuit 1006 for performing a fast parallel retention test. A test interface 1008 can also be included for SiP memory testing. Control registers and multiplexing circuitry are also preferably provided for address reconfiguration, and separate power planes and gating circuitry can be included for power management, as described above. The inventive principles can also enable reduced power consumption by reducing I/O loading using SiP solutions, by providing clock-less memory operation, and by shutting down unused memory sections. Voltage control, temperature compensation, and asynchronous timing circuitry can also help reduce power consumption and provide more efficient operation.

More specifically, as shown in FIG. 14A, the smart memory processor can be provided as an interface between various types of memory solutions 1004 (e.g., DRAM 1005, STT-RAM 1015, and MLC NAND memories 1010, for example), each having different benefits and capabilities, and the various device logic and processing components (e.g., ASIC multi-core processor 1030, Field-Programmable Gate Array (FPGA) 1035, Analog RF Power Management and Audio/Video processes 1040, and various Input/Output (I/O) devices 1045, for example). The smart memory controller 190 communicates with the various memory devices via the memory bus 1020, which preferably provides handshaking circuitry 1012 to guarantee read and write successes. The smart memory controller 190 communicates with the various device logic and processing components 1004 via the system bus 1025. The smart memory controller can include components such as those depicted and described above with respect to FIGS. 12 and 13, which provide further error reduction and correction capabilities and other value to the system.

Referring to FIG. 14B, a computer system 1105 can communicate with a data storage system 1110, such as a hard drive or other high capacity storage device (SSD/HDD) through a SATA, SCSI, USB, or other interface 1112. According to principles of the present inventive concept, the computer system 1105 can further be configured to communicate with working memory 1120 (e.g., a smart memory system) provided in a SiP, for instance, through a high-speed memory bus 1125. Within the working memory 1120, the smart memory controller 190 (here, an STT-MRAM controller) can be configured to communicate with the memory 1115 (non-volatile working memory, e.g., STT-MRAM, RRAM) through an asynchronous handshaking interface 1130. The handshaking interface 1130 preferably provides read/write acknowledgement as well as write error tagging and re-write capabilities. A constant voltage and/or current control system can also be provided along with fast error rate screening capabilities.

Figure 15C:
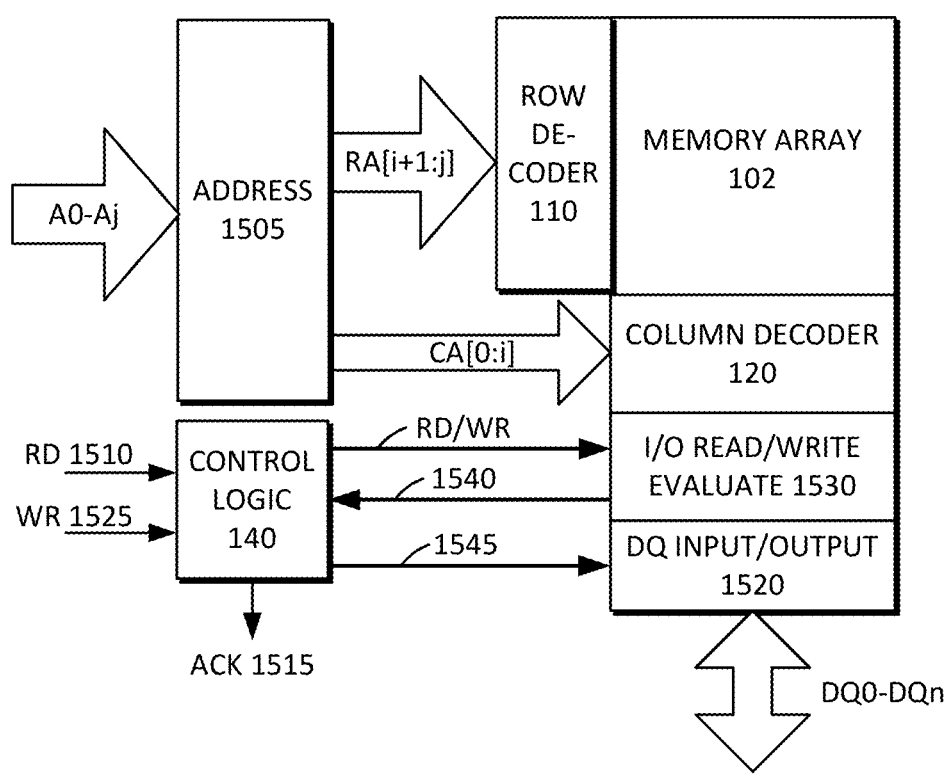
FIG. 15C is a schematic diagrams illustrating read/write operation handshaking circuitry associated with the tables of FIGS. 15A and 15B, according to additional principles of the inventive concept.
Figures 16A, 16B:
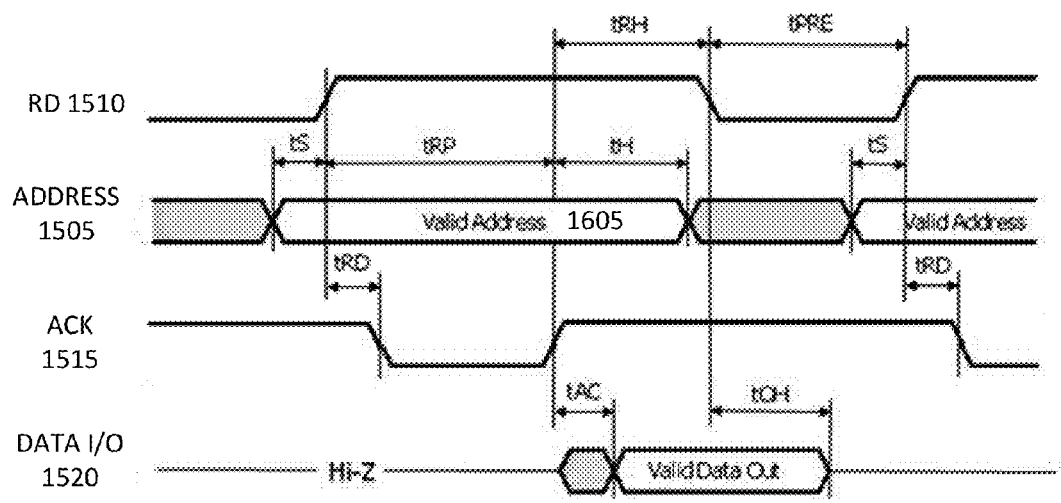
FIG. 16A is a Signal Table according to inventive concepts.
FIG. 16B is a schematic timing diagram of an asynchronous read operation with acknowledgement, associated with the table of FIG. 16A, according to inventive concepts.
Figures 17A, 17B:
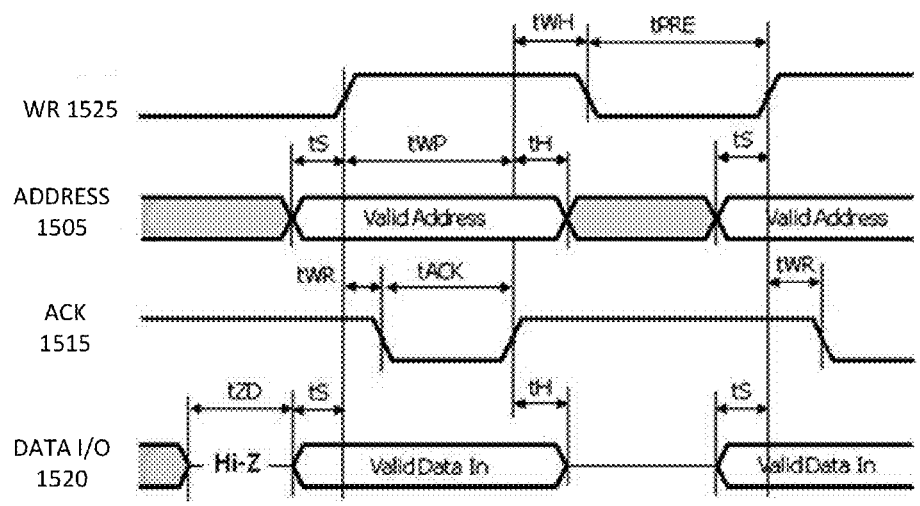
FIG. 17A is a Signal Table according to inventive concepts.
FIG. 17B is a schematic timing diagram of an asynchronous write operation with acknowledgement, associated with the table of FIG. 17A, according to inventive concepts.

FIGS. 15A and 15B are a pin out table and command table, respectively, according to inventive concepts. FIG. 15C is a schematic diagrams illustrating read/write operation handshaking circuitry associated with the tables of FIGS. 15A and 15B, according to additional principles of the inventive concept. FIG. 16A is a signal table according to inventive concepts. FIG. 16B is a schematic timing diagram of an asynchronous read operation with acknowledgement, associated with the table of FIG. 16A, according to inventive concepts. FIG. 17A is a Signal Table according to inventive concepts. FIG. 17B is a schematic timing diagram of an asynchronous write operation with acknowledgement, associated with the table of FIG. 17A, according to inventive concepts.

Referring to FIGS. 15A through 17B, the smart memory controller preferably includes a handshaking interface with acknowledgement to ensure proper read and/or write operations, thereby providing a reduction in memory errors. Referring specifically to FIGS. 15A-15C and 16A-16B, during an asynchronous read operation with handshaking, an address (e.g., A0-Aj) is placed on the address line 1505 and a read signal (RD) 1510 is sent to the control logic 140 to enable the read operation. As a valid address (e.g., valid address 1605) appears on the address line 1505, an acknowledgement signal (ACK) 1515 transitions from high to low. Once the data is successfully read out from the indicated address location, the acknowledgement signal (ACK) 1515 transitions back from low to high to indicate that the data is valid. The data is then output through the Data I/O 1520.

Referring now to FIGS. 15A-15C and 17A-17B, during an asynchronous write operation with handshaking, data to be written to the memory is placed on the Data I/O line 1520 and an address is placed on the address line 1505. A write signal (WR) 1525 is sent to initiate the write operation to the memory cell at the address location specified on the address line 1505. An acknowledgement signal (ACK) 1515 drops from high to low once the write process has started. Once the write operation is completed and the data is verified as having been properly written to the selected memory cell, the acknowledgement signal (ACK) 1515 transitions back from low to high to indicate that the write operation was successful.

The I/O read/write evaluate section 1530 may receive RD and/or WR signal from the control logic 140 and process the read or write signal. The section 1530 may also send a return signal 1540 to the control logic 140 based on the processing. The DQ input/output section 1520 may be controlled by the control logic 140 via the control signal 1545. By providing read and write operations with acknowledgement, memories such as those exhibiting probabilistic tendencies or slow read/write times can be implemented with lower error rates.

Figure 18A:
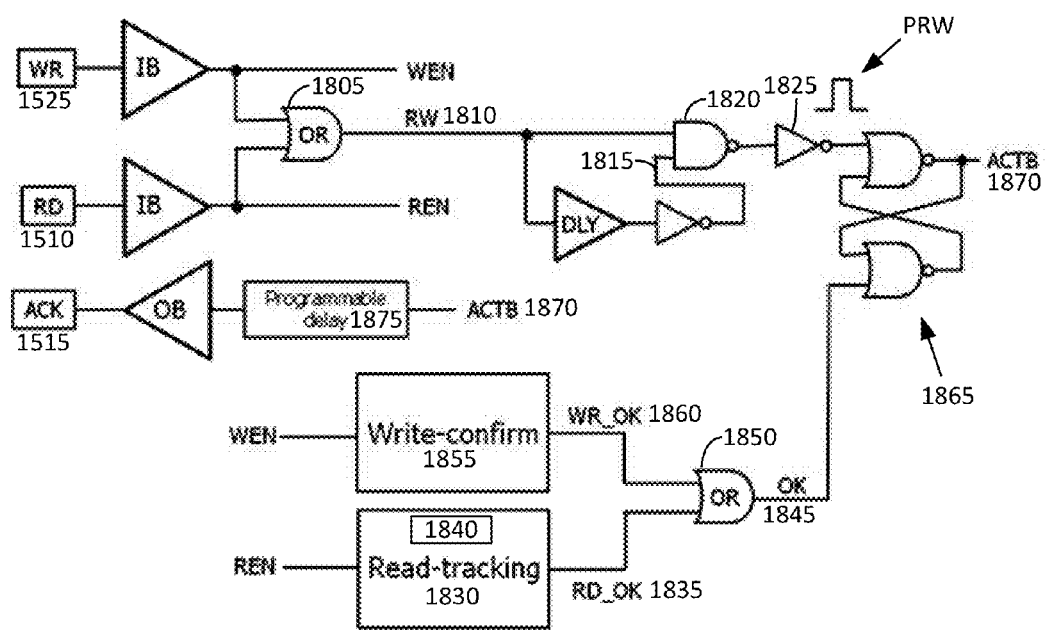
FIG. 18A is a schematic block and logic diagram of a memory control circuit for controlling the asynchronous read and write operations represented in FIGS. 16A through 17B.
Figure 18B:
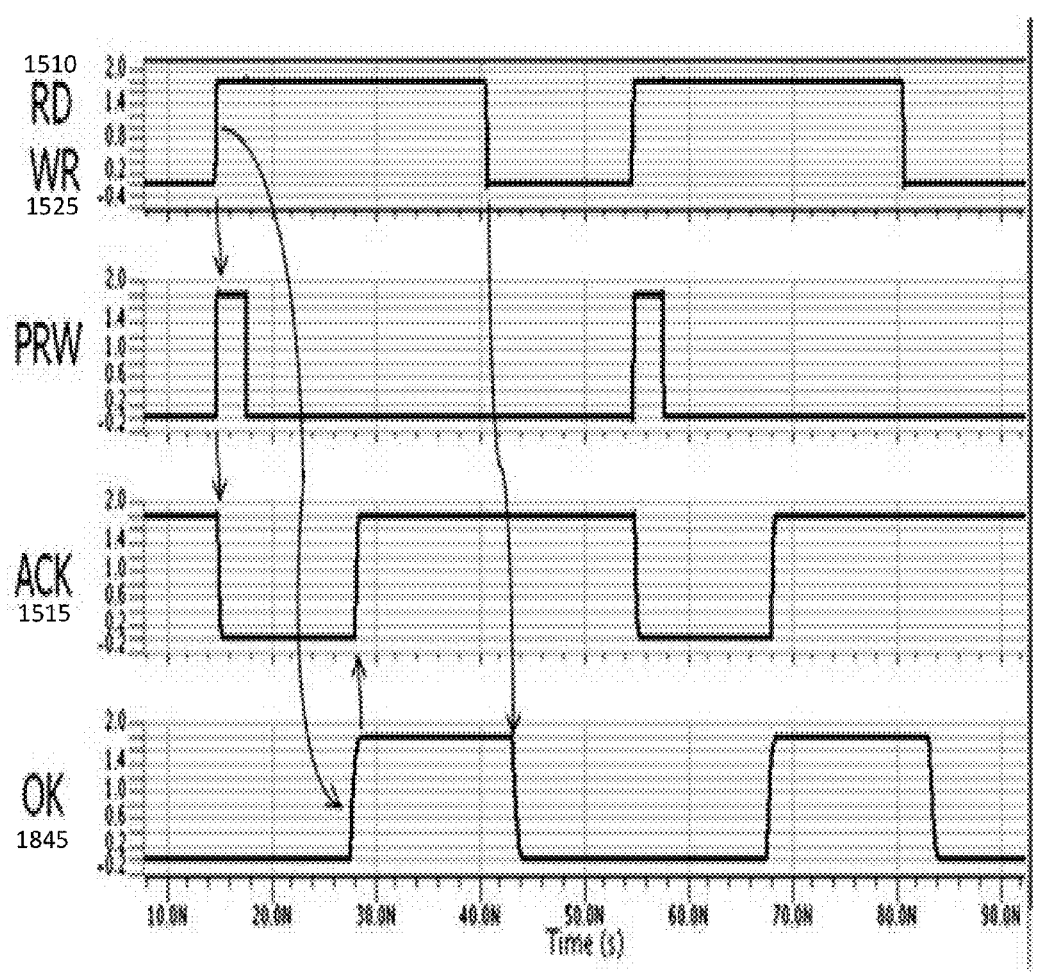
FIG. 18B is a signal timing diagram illustrating the timing of signals for the control circuit of FIG. 18A.

FIG. 18A is a schematic block and logic diagram of a memory control circuit, which can be used for controlling the read and write operations with acknowledgement as described above with respect to FIGS. 15A through 17B. FIG. 18B is a timing diagram illustrating the signals used and generated by the circuit of FIG. 18A. Referring now to FIGS. 18A and 18B, a read (RD) signal 1510 and/or write (WR) signal 1525 is generated by the device in response to user instructions. When either the RD or WR signal is activated, the circuit will generate a signal pulse PRW, which in turn initiates the acknowledge (ACK) signal 1515 by causing it to fall from high to low.

More specifically, an active write signal WR 1525 passes through an input buffer (IB) to provide the write enable signal (WEN). Similarly, an active read signal (RD) 1510 passes through an input buffer (IB) to provide the read enable signal (REN). When either enable signal WEN or REN passes through the OR gate 1805, it will generate a high RW signal 1810 that, when combined with its delayed complement 1815 in the NAND gate 1820 and then inverted by inverter 1825, creates the pulse PRW.

In a read cycle, the RD signal 1510 turns on the read path and the read tracking circuit 1830 (as further described with reference to FIG. 21 below). When data read from the memory cell is successfully retrieved and latched in a data output latch, the read ok (RD_OK) signal 1835 is generated by the SAE timing tracking and control circuitry 1840 (as further shown and described with reference to FIG. 23A below), producing the OK signal 1845 from the OR gate 1850, which brings the acknowledge (ACK) signal 1515 back to high to indicate that the read cycle has successfully completed.

Similarly, during a write cycle, the write (WR) signal 1525 turns on the write path and the write confirmation circuit 1855 (as further shown and described with reference to FIG. 20B below). Once the data has been written, and verified using the write confirmation circuit 1855, the write ok (WR_OK) signal 1860 is generated, which also produces the OK signal 1845 from the OR gate 1850, which brings the acknowledge (ACK) signal 1515 back to high to indicate that the write cycle has successfully completed.

More specifically, either the WR_OK signal 1860 from the write confirm circuit 1855 or the RD_OK signal 1835 from the read tracking circuit 1830 when passed through the OR gate 1850 will generate the OK signal 1845. The OK signal 1845 is then transmitted to a latch 1865, which outputs the acknowledge triggering signal (ACTB) 1870. The ACTB signal 1870 is then passed through a programmable delay 1875 to an output buffer (OB) to bring the ACK signal 1515 back to high.

Figure 19:
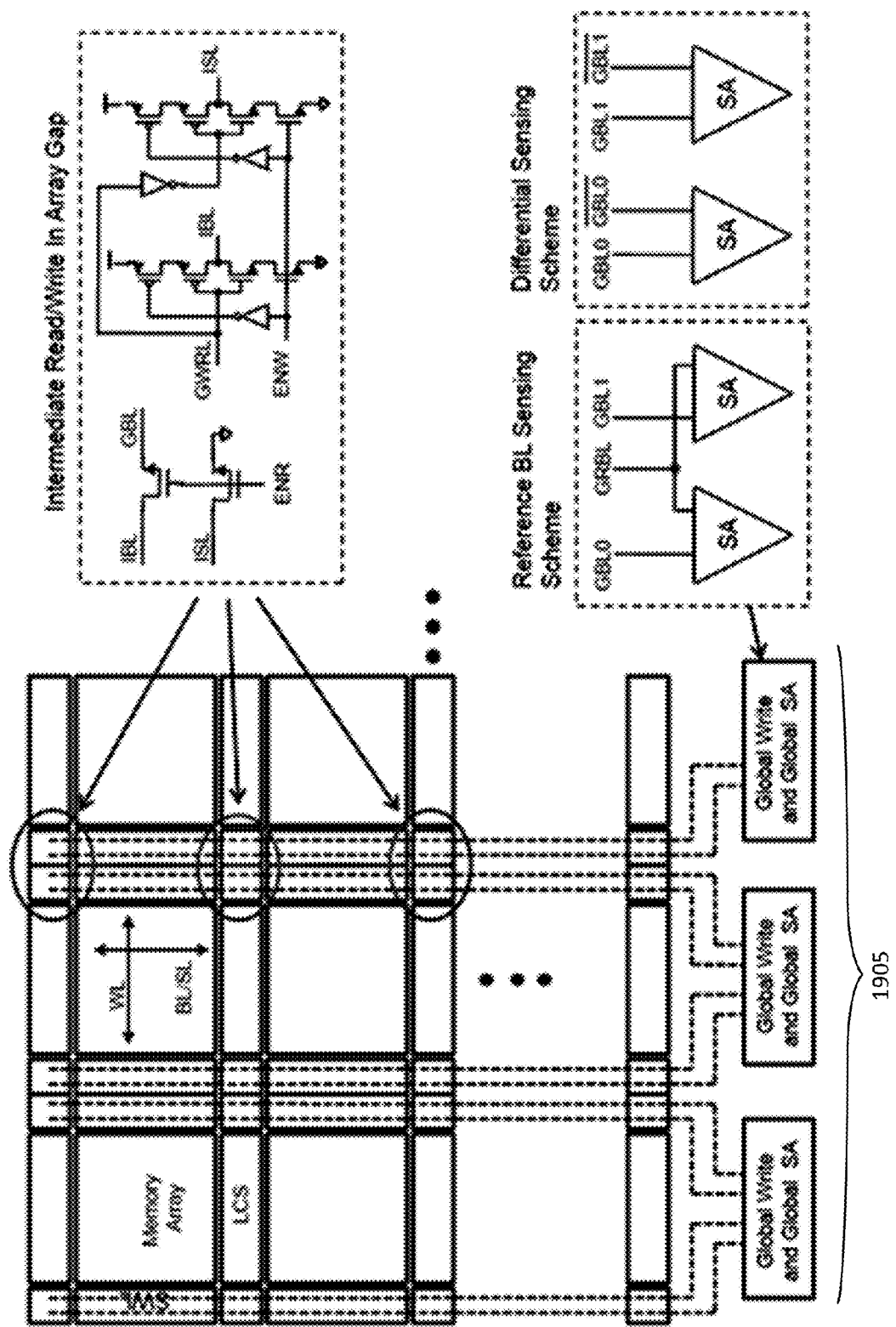
FIG. 19 is a schematic block and circuit diagram of a scalable hierarchical read/write architecture that can be used in the read and write operations represented in FIGS. 16A through 17B.

FIG. 19 is a schematic diagram of a scalable hierarchical read/write architecture, which can be used in the read and write operations of FIGS. 16A through 17B. Referring to FIG. 19, read or write operations of the memory device proceed with respect to memory cells selected from a memory array using wordlines and bitlines/select lines. Data retrieved from the selected memory cell is passed to a global sense amplifier (SA) (e.g., 1905) to read the data output from the cell. Data to be written to the selected memory cell is provided to the cell by the global write circuit (e.g., 1905).

Figure 20A:
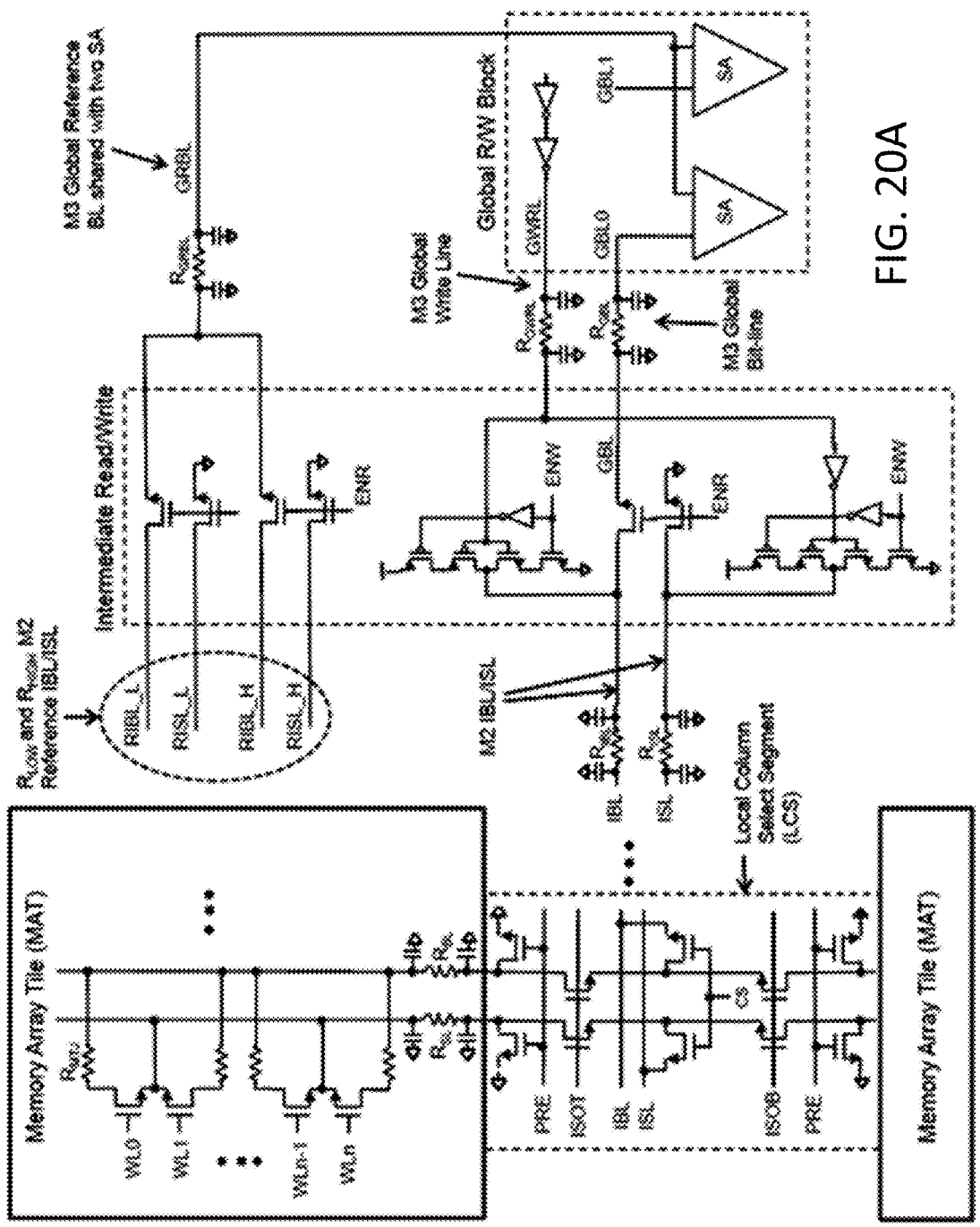
FIG. 20A provides schematic circuit diagrams of a memory array and control circuit according to inventive concepts.
Figure 20B:
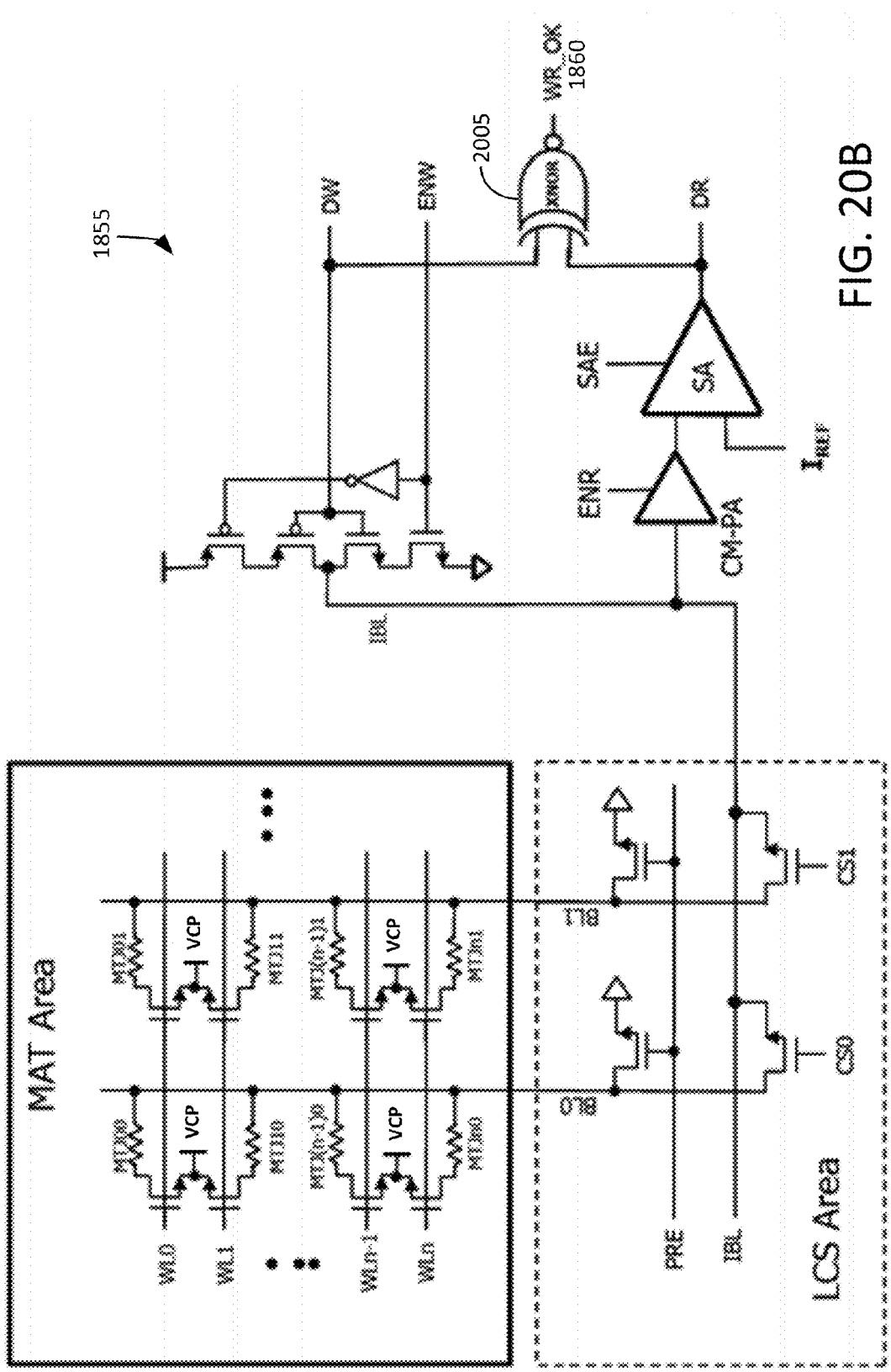
FIG. 20B is a schematic circuit and logic diagram of a write confirmation circuit constructed according to inventive concepts.

FIG. 20A provides schematic diagrams of a memory array and control circuit. FIG. 20B is a schematic diagram of a write confirmation circuit 1855. Referring to FIG. 20B, a write verify and re-write operation will now be described. During a write operation, a memory cell in the Memory Array Tile (MAT) Area is selected by activating its corresponding wordline (WL) and bitline (BL). Data is then written into the selected memory cell. A write control circuit disables the local write enable signal (ENW) after the required write pulse width (tWP), e.g., 5 ns. A local read enable signal (ENR) is then generated to read the data from the same address location that was just written to during the write operation. The data-in (DW) line is held valid and compared to the data-out (DR) line via the XNOR gate 2005. If the two data signals (DW and DR) are different, the write ok (WR_OK) signal 1860 remains low, indicating that the write operation has not been successful. If the two data signals (DW and DR) are the same (indicating that the data that was supposed to be written to the memory cell was the same as the data that was read from that cell), then the WR_OK signal 1860 goes high, signaling a successful write operation. As discussed previously, the WR_OK signal 1860 can then be used to generate an acknowledgement signal 1515, which indicates to the memory controller that the write operation was successful. Alternatively, a re-settable register or enable circuit (not shown) can be used to ensure WR_OK is reset low and held low until after the write operation starts and the DR is valid.

Read tracking can be used to complete the write-verify read operation and strobe the compare output (WR_OK) signal 1860. When the WR_OK signal 1860 goes high, the write cycle is complete. If a low signal is detected in the WR_OK signal 1860, the write control circuit generates a new write cycle in the same address location to re-write the data, and the verification process repeats itself. This process can continue until the write operation is successful or until the cell is determined to be defective and its address is reported to the NVM Program Memory 195.

Figure 21:
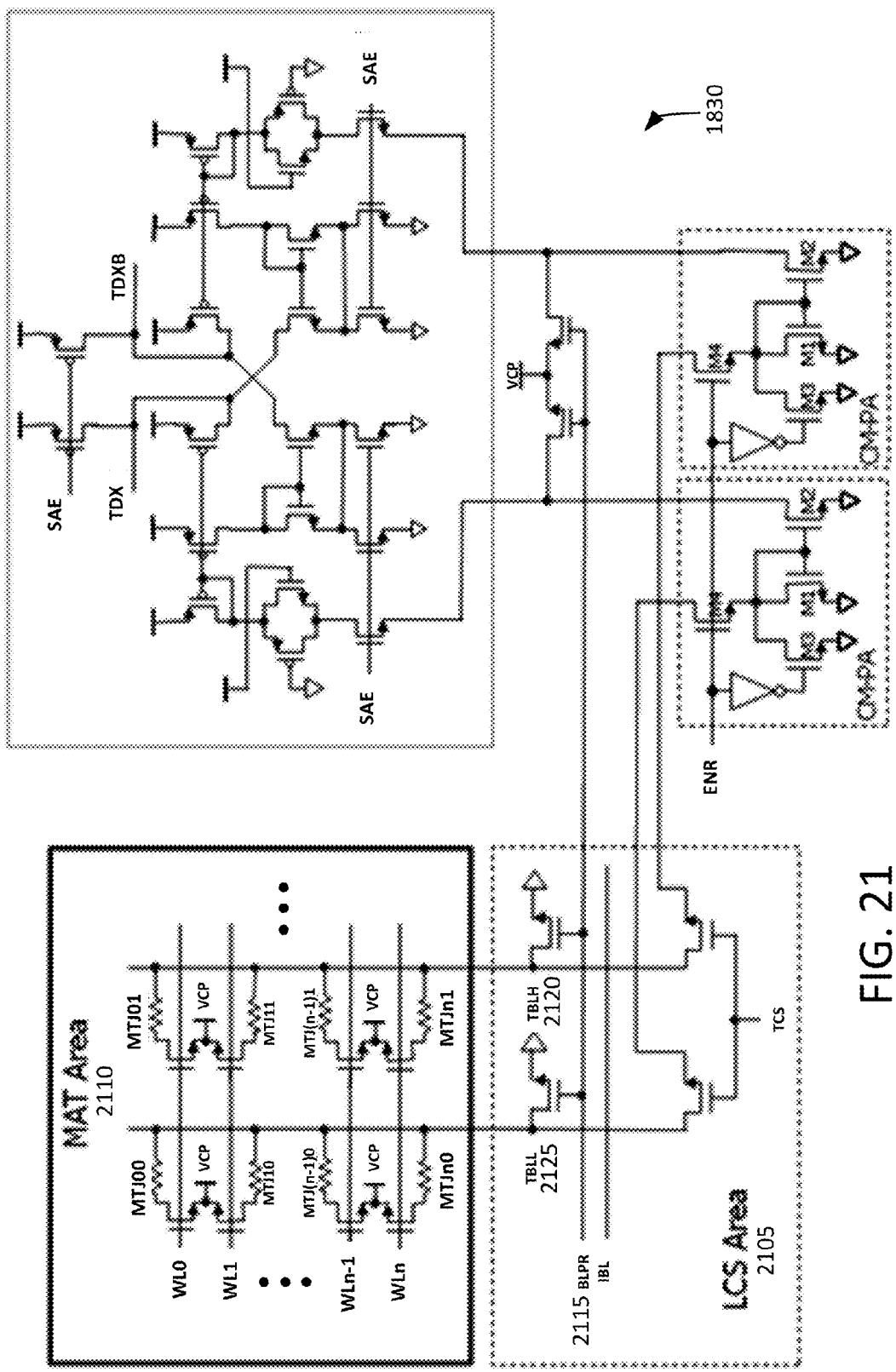
FIG. 21 is a schematic diagram of a read tracking circuit constructed according to inventive concepts.
Figure 22:
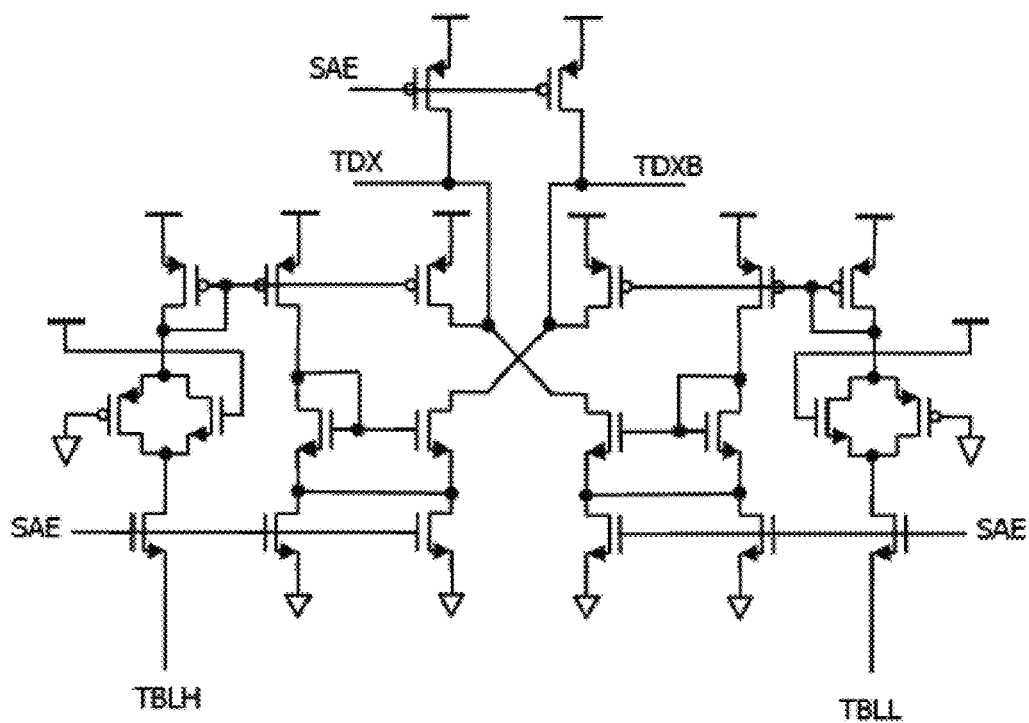
FIG. 22 is a schematic diagram of current-voltage converter and amplification circuitry according to inventive concepts.
Figure 23A:
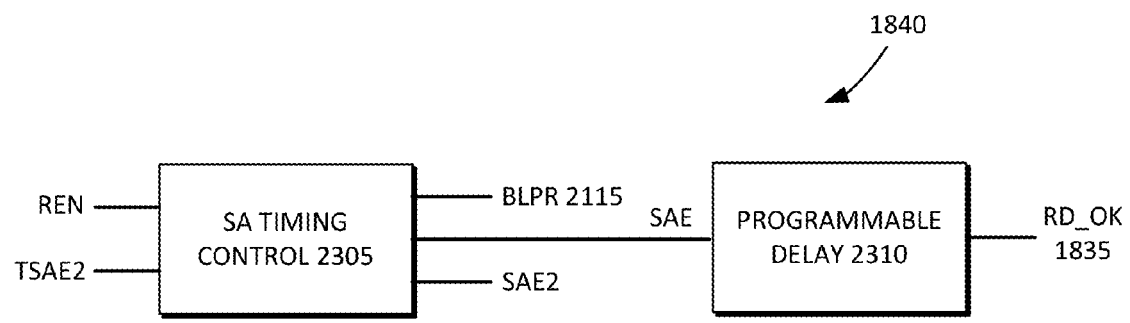
FIGS. 23A and 23B include schematic block diagrams of SAE timing tracking and control circuitry according to inventive concepts.
Figure 23B:
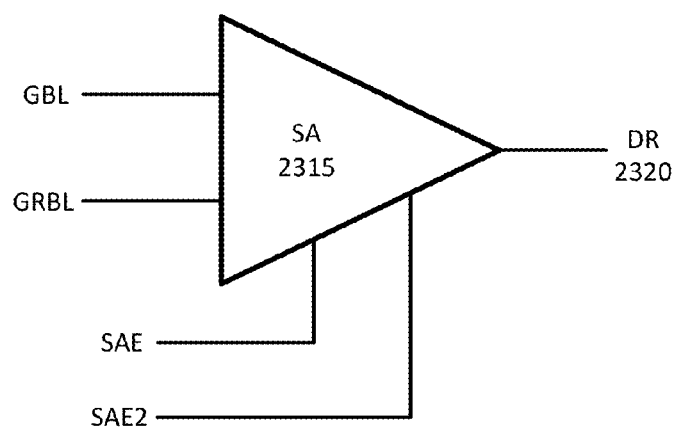
Figure 24:
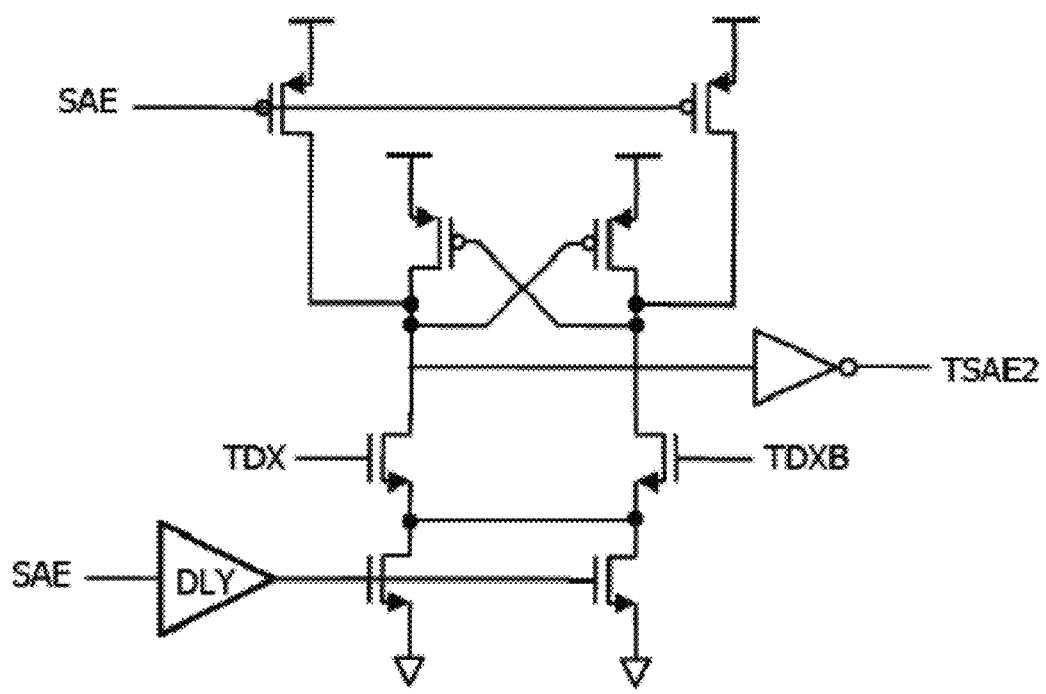
FIG. 24 is a schematic diagram of analog to digital conversion circuitry according to further inventive concepts.

FIG. 21 is a schematic diagram of a read tracking circuit 1830. FIG. 22 is a schematic diagram of current-voltage converter and amplification circuitry. FIGS. 23A and 23B include schematic block diagrams of SAE timing tracking and control circuitry. FIG. 24 is a schematic diagram of analog to digital conversion circuitry.

Referring now to FIGS. 20A, 20B, 21, 22, 23A, 23B and 24, in the read tracking circuitry 1830, a dummy read path can be used to track the read circuit (RC) delay. The read tracking circuit 1830 can include current-voltage conversion and voltage amplification circuitry, along with current meter pre-amplifier circuits (similar to that shown and described with respect to FIG. 7). Local Column Select (LCS) circuitry 2105 communicates with the MAT area 2110 and passes a bitline precharge signal (BLPR) 2115 to the read tracking circuit 1830 along with data sensed on the selected true and complement bitlines (TBLH 2120 and TBLL 2125).

The dummy read path can include bit lines (BLs), column select transistors, pre-amps, and global sense amps. True and complement dummy BLs ($R_{high}$, TBLH, $R_{low}$, and TBLL) are used to generate the sensing delay. An output tracking sense amp signal (e.g., TSAE2 of FIG. 24) of the dummy sense amp activates when enough separation is generated from the first stage (TDX/TDXB). An active TSAE2 signal triggers SAE2 (of FIGS. 23A and 23B) to latch normal data in the regular sense amp (SA) 2315 and isolate the current path in each SA stage.

The Read Enable signal (REN) and TSAE2 are input into a sense amp timing control circuit 2305 (of FIG. 23A). The sense amp timing control circuit 2305 generates the bitline precharge (BLPR) signal 2115 and the sense amp enable signals (e.g., SAE and SAE2). The bitline precharge (BLPR) signal 2115 is held high until about the time the read operation is to be performed. After it is released (i.e., shut off), the read is performed. More specifically, either REN or WEN can deactivate the BLPR signal, which releases the bitlines for reading or writing. The sense amp enable signal (SAE) is passed through a programmable delay 2310 (of FIG. 23A) to produce the RD_OK signal 1835. The sense amp (SA) 2315 (of FIG. 23B) receives the sense amp enable signals (SAE and SAE2) and global bitline voltages (GBL and GRBL) (see FIG. 19) and outputs the read data signal DR 2320.

Figure 25A:
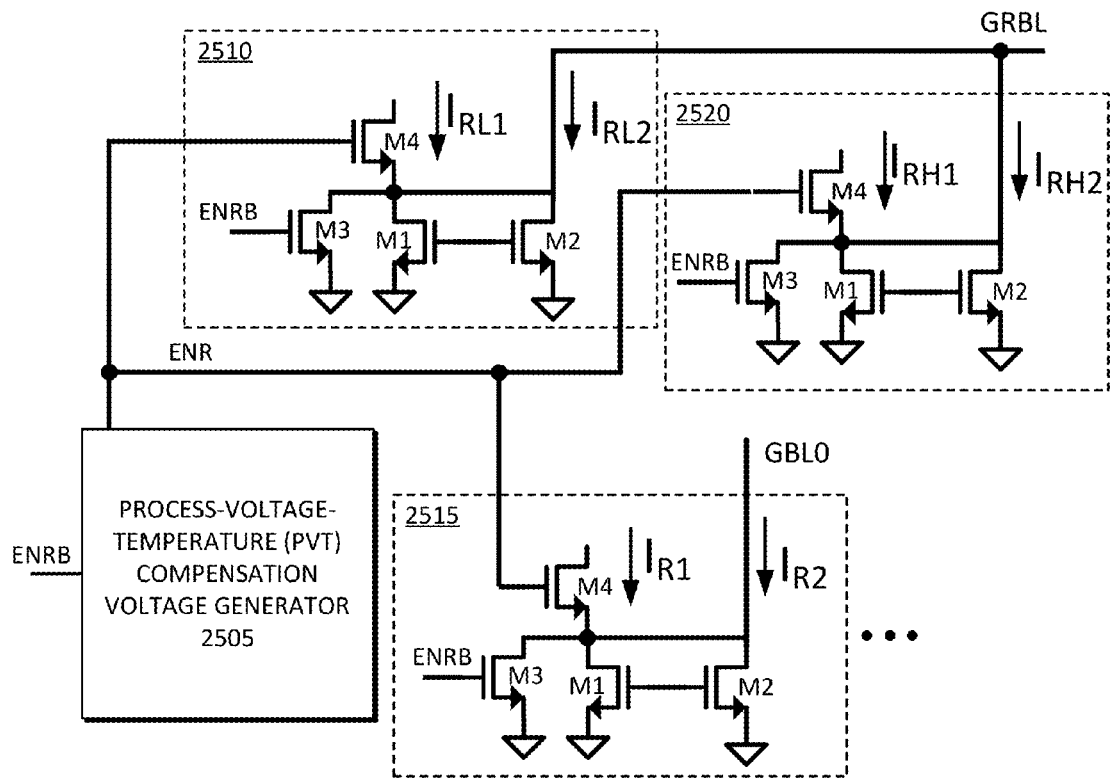
FIG. 25A is a schematic block and circuit diagram of temperature compensation voltage generation circuitry, according to further inventive concepts.
Figure 25B:
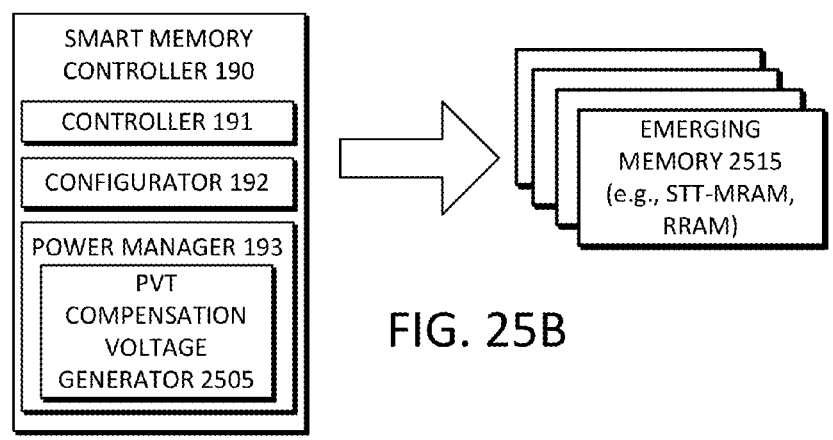
FIG. 25B is a schematic system block diagram including the circuitry of FIG. 25A.

FIG. 25A is a schematic block and circuit diagram of temperature compensation voltage generation circuitry 2505, according to further inventive concepts. FIG. 25B is a schematic system block diagram including the circuitry of FIG. 25A. Reference is now made to FIGS. 25A and 25B.

Power management systems can be important in STT-RAM memory applications, for example, because low read voltages and currents assist in preventing read disturbances during the read operation. A read current that is too high could result in data corruption, for example, by causing the data to switch from a "1" to a "0" value.

The smart memory controller 190 may include power manager 193. The power manager 193 may include a process-voltage-temperature (PVT) compensation voltage generator 2505. The PVT compensation voltage generator 2505 controls a voltage level of an enable read (ENR) signal to provide a stable and constant read current through M1 transistors. The PVT compensation voltage generator 2505 can compensate for temperature fluctuations and other power variables to provide stable supply voltages for the memory operations. The PVT compensation voltage generator 2505 may be coupled to multiple groups (e.g., 2510, 2515, and 2520) of MOS transistors (e.g., M1, M2, M3, and M4). The PVT compensation voltage generator 2505 may transmit the voltage-level-controlled ENR signal to the groups of MOS transistors. The ENR and ENRB signals cause stable and constant read currents to flow through the MOS transistors. For example, currents $I_{RL1}$ and $I_{RL2}$ are associated with group 2510, currents $I_{RH1}$ and $I_{RH2}$ are associated with group 2520, and currents $I_{R1}$ and $I_{R2}$ are associated with group 2515.

The smart memory system can therefore be configured according to additional principles of the present inventive concepts to implement power management technologies, which can control the sense amp (SA) read current, control SA clamp voltages, control SA read delay, control write voltage, control periphery voltage during stand-by, and/or control other power requirements of the memory device 2515. The power management system can further provide temperature-based compensations to the voltage levels.

Figure 26A:
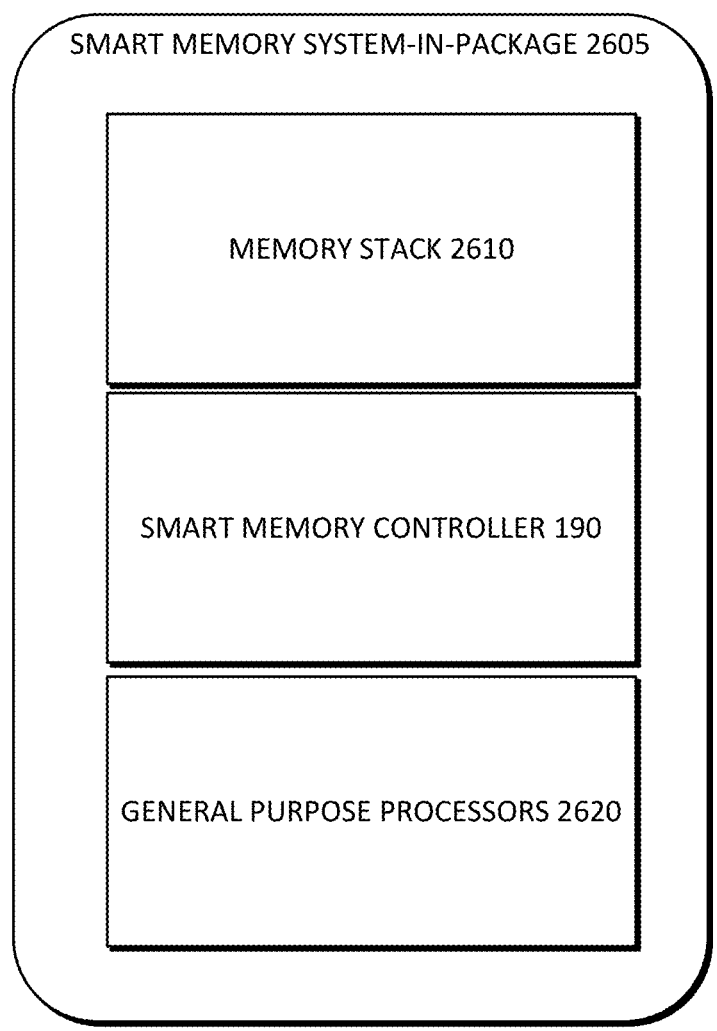
FIGS. 26A and 26B are schematic block diagrams illustrating a System-in-Package (SiP) smart memory system configuration according to inventive concepts.
Figure 26B:
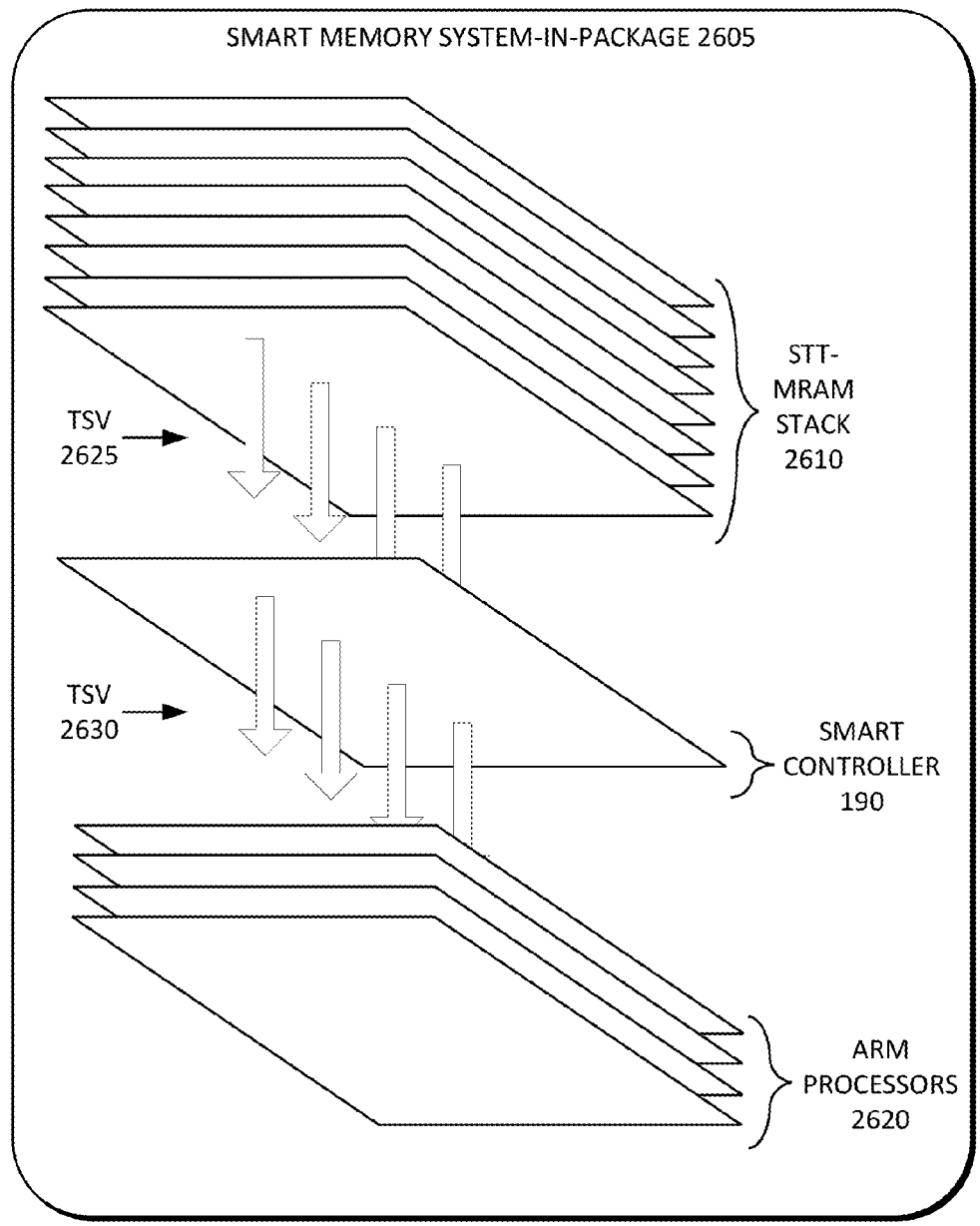

FIGS. 26A and 26B are schematic block diagrams illustrating a System-in-Package (SiP) smart memory system 2605 according to inventive concepts. The smart memory system 2605 may include a memory stack 2610, a smart memory controller 190, and one or more general purpose processors 2620. Certain features and benefits of this inventive concept can be achieved, for example, through incorporation of the smart memory system in a System in Package (SiP) or System on Chip (SoC) design.

It should be noted that implementation of certain of the inventive features in a SiP device benefit from good connectivity between the memory array and memory processor chips to provide improved system performance. This may be accomplished, for instance, by utilizing low latency and high throughput SiP interconnects such as True Silicon Via (TSV) or other System-in-Package (SiP) technology. For example, TSV interconnects 2625 may provide connectivity between the memory stack 2610 and the smart memory controller 190. Similarly, TSV interconnects 2630 may provide connectivity between the smart memory controller 190 and the one or more arm processors 2620. Any cost disadvantages of such a system may be minimized as interconnect technology costs continue to decrease.

Referring specifically to FIG. 26B, a smart memory system according to various principles of the present inventive concept can be implemented as an SiP device. The SiP device can include a memory stack (such as an STT-MRAM memory stack 2610, for example) arranged on a smart memory controller 190, which in turn is arranged on one or more RISC processors (such as general purpose ARM processors 2620, for instance). The memory stack can communicate with the smart memory controller 190, and the smart memory controller 190 with the processors 2620 through respective True Silicon Vias (TSVs) 2625 and 2630, respectively.

It should be noted that the inventive concepts are not limited by any of the specific embodiments described in the foregoing summary, and that numerous other aspects and embodiments utilizing the present inventive concepts will be readily understood by those of ordinary skill in the art from the disclosures provided herein. Details of these and other embodiments are included in the detailed description and the accompanying drawings.

The foregoing illustrative embodiments are not to be construed as limiting the invention thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A smart memory system comprising:
    a memory comprising one or more memory arrays;
    a memory processor;
    a common memory bus configured to provide an asynchronous handshaking interface between the one or more memory arrays and the memory processor to provide verification of read and write operation success or failures; and
    a non-volatile error retention memory configured to receive address information from the memory processor relating to memory locations exhibiting errors,
    wherein said memory processor is configured to perform one or more error-correction processes on the memory locations whose addresses are stored in the non-volatile error retention memory;
    the smart memory system further comprising:
    control logic configured to receive at least one of a read signal or a write signal; and
    an address line configured to receive a memory address,
    wherein the control logic is configured to cause a first transition of a logic state of an acknowledgment signal responsive to the memory address.

2. The smart memory system of claim 1, wherein:
    the control logic is configured to cause a second transition of the logic state of the acknowledgment signal responsive to a successful read operation or a successful write operation at said memory address.

3. The smart memory system of claim 2, wherein:
    the first transition of the logic state of the acknowledgment signal is from a high state to a low state; and
    the second transition of the logic state of the acknowledgment signal is from the low state to the high state.

4. The smart memory system of claim 1, further comprising:
    a write error address tag buffer configured to temporarily store the address information relating to the memory locations exhibiting errors,
    wherein the non-volatile error retention memory is configured to receive the address information relating to the memory locations exhibiting errors from the write error address tag buffer via the common memory bus under control of the memory processor.

5. The smart memory system of claim 4, wherein the non-volatile error retention memory is configured to accumulate and store, in a table, the address information relating to the memory locations exhibiting errors.

6. The smart memory system of claim 5, wherein the non-volatile error retention memory is configured to accumulate and store error types associated with the address information relating to the memory locations exhibiting errors.

7. The smart memory system of claim 6, wherein the memory processor is configured to recall a fail location from the table stored in the non-volatile error retention memory and to perform a fix operation based on an associated error type stored in the non-volatile error retention memory.

* * * * *